(12) United States Patent
Ni et al.

(10) Patent No.: US 7,771,215 B1
(45) Date of Patent: Aug. 10, 2010

(54) MLC COB USB FLASH MEMORY DEVICE WITH SLIDING PLUG CONNECTOR

(75) Inventors: Jim Chin-Nan Ni, San Jose, CA (US);
Abraham C. Ma, Fremont, CA (US);
David Nguyen, San Jose, CA (US);
Charles C. Lee, Cupertino, CA (US);
Ming-Shiang Shen, Taipei (TW)

(73) Assignee: Super Talent Electronics, Inc., San Jose, CA (US)

( * ) Notice: Subject to any disclaimer, the term of this patent is extended or adjusted under 35 U.S.C. 154(b) by 161 days.

(21) Appl. No.: 12/171,194

(22) Filed: Jul. 10, 2008

Related U.S. Application Data

(63) Continuation-in-part of application No. 12/128,916, filed on May 29, 2008, now Pat. No. 7,552,251, and a continuation-in-part of application No. 12/050,748, filed on Mar. 18, 2008, now Pat. No. 7,628,622, and a continuation-in-part of application No. 11/933,226, filed on Oct. 31, 2007, now Pat. No. 7,524,198, and a continuation-in-part of application No. 11/845,747, filed on Aug. 27, 2007, which is a continuation of application No. 11/309,594, filed on Aug. 28, 2006, now Pat. No. 7,383,362, which is a continuation-in-part of application No. 10/707,277, filed on Dec. 2, 2003, now Pat. No. 7,103,684, application No. 12/171,194, which is a continuation-in-part of application No. 12/141,879, filed on Jun. 18, 2008, which is a continuation-in-part of application No. 12/099,421, filed on Apr. 8, 2008, which is a continuation-in-part of application No. 12/025,706, filed on Feb. 4, 2008, application No. 12/171,194, which is a continuation-in-part of application No. 11/624,667, filed on Jan. 18, 2007.

(51) Int. Cl.
*H01R 13/44* (2006.01)
(52) U.S. Cl. ...................................... 439/131; 439/528
(58) Field of Classification Search ................. 439/131, 439/528
See application file for complete search history.

(56) References Cited

U.S. PATENT DOCUMENTS

| | | | |
|---|---|---|---|
| 5,623,552 | A | 4/1997 | Lane |
| 5,907,856 | A | 5/1999 | Estakhri et al. |
| 5,959,541 | A | 9/1999 | DiMaria et al. |
| 6,000,006 | A | 12/1999 | Bruce et al. |
| 6,012,636 | A | 1/2000 | Smith |
| 6,069,920 | A | 5/2000 | Schulz et al. |
| 6,081,858 | A | 6/2000 | Abudayyeh et al. |
| 6,125,192 | A | 9/2000 | Bjorn et al. |
| 6,193,152 | B1 | 2/2001 | Fernando et al. |

(Continued)

*Primary Examiner*—Tho D Ta
*Assistant Examiner*—Travis Chambers
(74) *Attorney, Agent, or Firm*—Blakely Sokoloff Taylor & Zafman LLP

(57) ABSTRACT

Briefly, a portable USB flash memory device is disclosed to include a Chip-On-Board COB Printed Circuit Board Assembly PCBA inside. The flash memory device is enclosed inside a housing structure with a sliding button to deploy the USB plug connector external to the housing structure. The flash memory device with Multi-Level-Cell MLC compatible is being able to connect to a host with a Universal Serial Bus USB interface.

20 Claims, 34 Drawing Sheets

U.S. PATENT DOCUMENTS

| | | | |
|---|---|---|---|
| 6,202,138 B1 | 3/2001 | Estakhri et al. | |
| 6,230,233 B1 | 5/2001 | Lofgren et al. | |
| 6,275,894 B1 | 8/2001 | Kuo et al. | |
| 6,321,478 B1 | 11/2001 | Klebes | |
| 6,334,793 B1 | 1/2002 | Amoni et al. | |
| 6,547,130 B1 | 4/2003 | Shen | |
| 6,636,929 B1 | 10/2003 | Frantz et al. | |
| 6,676,419 B1 * | 1/2004 | Lin et al. | 439/76.1 |
| 6,718,407 B2 | 4/2004 | Martwick | |
| 6,778,401 B1 | 8/2004 | Yu et al. | |
| 6,880,024 B2 | 4/2005 | Chen et al. | |
| 7,021,971 B2 | 4/2006 | Chou et al. | |
| 7,044,802 B2 | 5/2006 | Chiou et al. | |
| 7,092,256 B1 * | 8/2006 | Salazar et al. | 361/737 |
| 7,097,472 B2 | 8/2006 | Parker | |
| 7,103,684 B2 | 9/2006 | Chen et al. | |
| 7,103,765 B2 | 9/2006 | Chen | |
| 7,104,848 B1 | 9/2006 | Chou et al. | |
| 7,125,287 B1 | 10/2006 | Chou et al. | |
| 7,155,545 B1 | 12/2006 | Wang | |
| 7,182,646 B1 | 2/2007 | Chou et al. | |
| 7,249,978 B1 | 7/2007 | Ni | |
| 7,257,714 B1 | 8/2007 | Shen | |
| 7,259,967 B2 | 8/2007 | Ni | |
| 7,264,992 B2 | 9/2007 | Hsueh et al. | |
| 7,287,705 B2 * | 10/2007 | Tang | 235/492 |
| 7,359,208 B2 | 4/2008 | Ni | |
| 7,361,059 B2 | 4/2008 | Harkabi et al. | |
| 7,524,198 B2 * | 4/2009 | Nguyen et al. | 439/131 |
| 7,581,967 B2 * | 9/2009 | Collantes et al. | 439/131 |
| 2001/0043174 A1 | 11/2001 | Jacobsen et al. | |
| 2002/0166023 A1 | 11/2002 | Nolan et al. | |
| 2003/0046510 A1 | 3/2003 | North | |
| 2003/0163656 A1 | 8/2003 | Ganton | |
| 2004/0148482 A1 | 7/2004 | Grundy et al. | |
| 2004/0255054 A1 | 12/2004 | Pua et al. | |
| 2005/0102444 A1 | 5/2005 | Cruz | |
| 2005/0160213 A1 | 7/2005 | Chen | |
| 2005/0193161 A1 | 9/2005 | Lee et al. | |
| 2005/0223158 A1 * | 10/2005 | See et al. | 711/103 |
| 2005/0246243 A1 | 11/2005 | Adams et al. | |
| 2005/0268082 A1 | 12/2005 | Poisner | |
| 2006/0065743 A1 | 3/2006 | Fruhauf | |
| 2006/0075174 A1 | 4/2006 | Vuong | |
| 2006/0106962 A1 | 5/2006 | Woodbridge et al. | |
| 2006/0161725 A1 | 7/2006 | Lee et al. | |
| 2006/0206702 A1 | 9/2006 | Fausak | |
| 2006/0242395 A1 | 10/2006 | Fausak | |
| 2007/0079043 A1 | 4/2007 | Yu et al. | |
| 2007/0094489 A1 | 4/2007 | Ota et al. | |
| 2007/0113067 A1 | 5/2007 | Oh et al. | |
| 2007/0113267 A1 | 5/2007 | Iwanski et al. | |
| 2007/0130436 A1 | 6/2007 | Shen | |

* cited by examiner

Data structure of PLTPPUI in Reserved Area of MLC Flash Memory 420

Old physical block (PBK#1000) for storing PLTPPUI0 422

| | | | | 446 |
|---|---|---|---|---|
| 1st Write (P0) 424a | Entry 0 | Entry 1 | ••• | FF — Special Logical Address for PLTPPUI0 — 1 |
| 2nd Write (P1) 424b | Entry 0 | Entry 1 | | FF — Special Logical Address for PLTPPUI0 |
| ••• | | | | |
| nth Write (Pn) 424n | Entry 0 | Entry 1 | ••• | |

425 ... 426 ... 427 ... 442

New physical block (PBK#1012) for storing PLTPPUI0 432

| | | | | |
|---|---|---|---|---|
| (n+1)th Write (P0) 434 | Entry 0 | ••• | | FF — Special Logical Address for PLTPPUI0 — 2 |
| | | | | |
| | | | | |
| | | | | |

*FIG. 4C*

Data Structure of the PLTPPUI Tracking Table 440

| | Physical Block Number 444 | Tracking No. (TN) 446 | Highest Page 448 |
|---|---|---|---|
| Special Logical Address for PLTPPUI0 | 1012 | 0 | 0 |
| Special Logical Address for PLTPPUI1 | 1018 | 5 | 1 |
| ⋮ | | | |
| Special Logical Address for PLTPPUIN | 1005 | 4 | 0 |

Data Structure of the WL/BB Tracking Table 450

| | Physical Block Number 454 | Tracking No. (TN) 456 | Highest Page 458 |
|---|---|---|---|
| Special Logical Address for WL/BB0 | 1023 | 1 | 5 |
| Special Logical Address for WL/BB1 | 1020 | 0 | 3 |
| ... | | | |
| Special Logical Address for WL/BBn | 1021 | 3 | 7 |

*FIG. 4E*

Data Structure of the WL/BB Tracking Table in Reserved Area of Flash Memory 460

| | | | | | | 467 | 452 | 456 |
|---|---|---|---|---|---|---|---|---|
| 1st Write (P0) | BK0 (Reserved) | BK1 WL | | | | BK7 BB FFFF FFEE | Special Logical Address for WL/BB1 | 1 |
| | | | | | | F | F | |
| 2nd Write (P1) | | BK1 WL old | BK3 WL new | | | | | |
| 3rd Write (P2) | | BK1 WL old | BK3 WL old | BK5 WL new | | | | |
| ⋮ | | | | | | | | |
| nth Write (Pn) | | | | | BK1000 WL new | | | |

| 1st Write (P0) | BK1000 WL new | | BK1003 BB | | | | Special Logical Address for WL/BB2 | 1 |
|---|---|---|---|---|---|---|---|---|
| | | | | | | F | F | |
| 2nd Write (P1) | BK1000 WL old | | | BK1021 WL new | | | | |
| ⋮ | | | | | | | | |
| nth Write (Pn) | | | | | | | | |

*FIG. 4F*

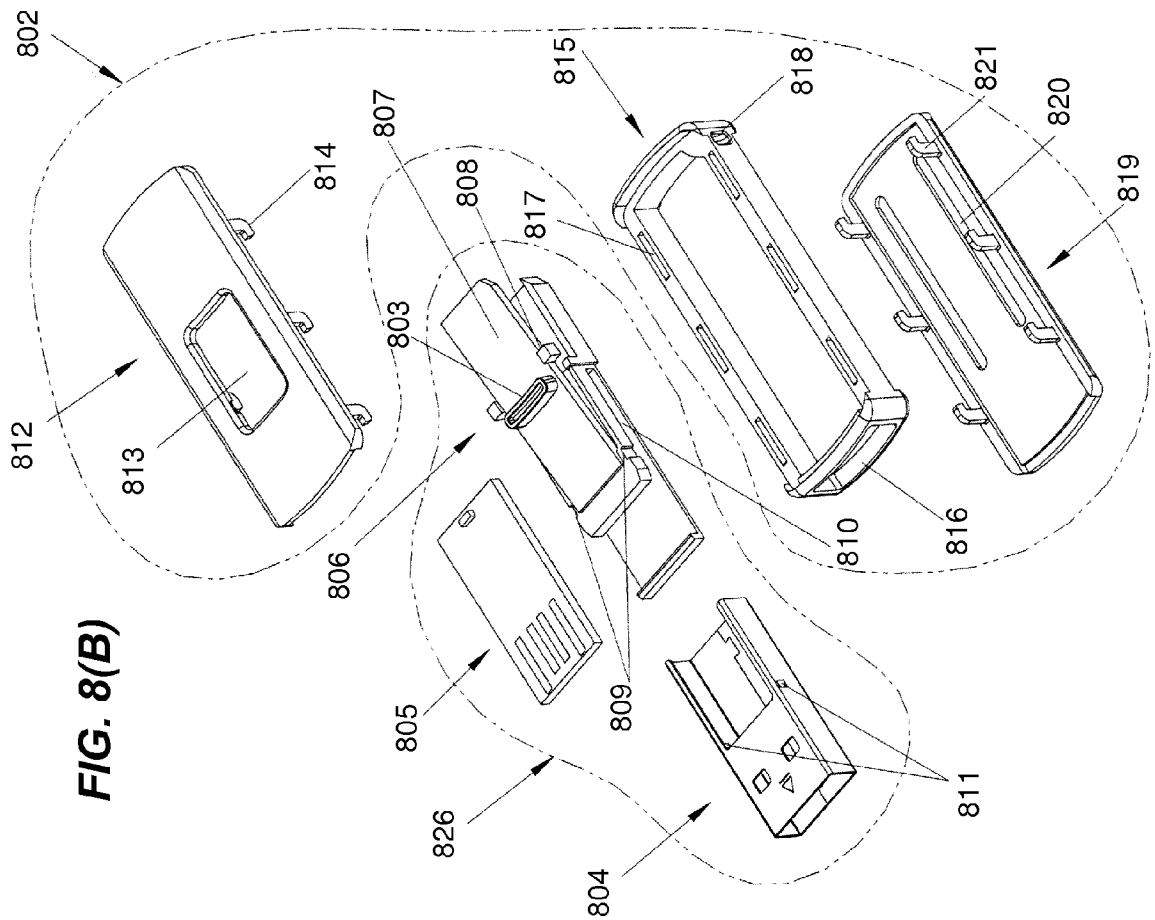
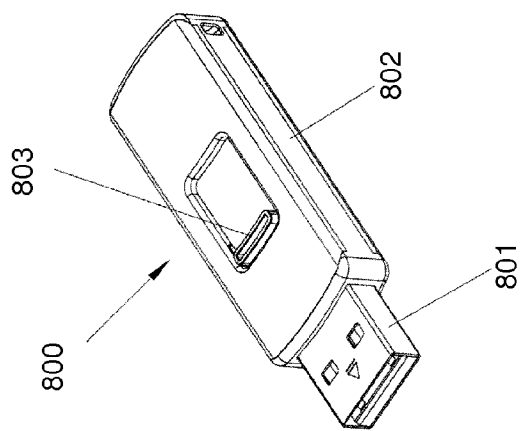
FIG. 8(B)
FIG. 8(A)

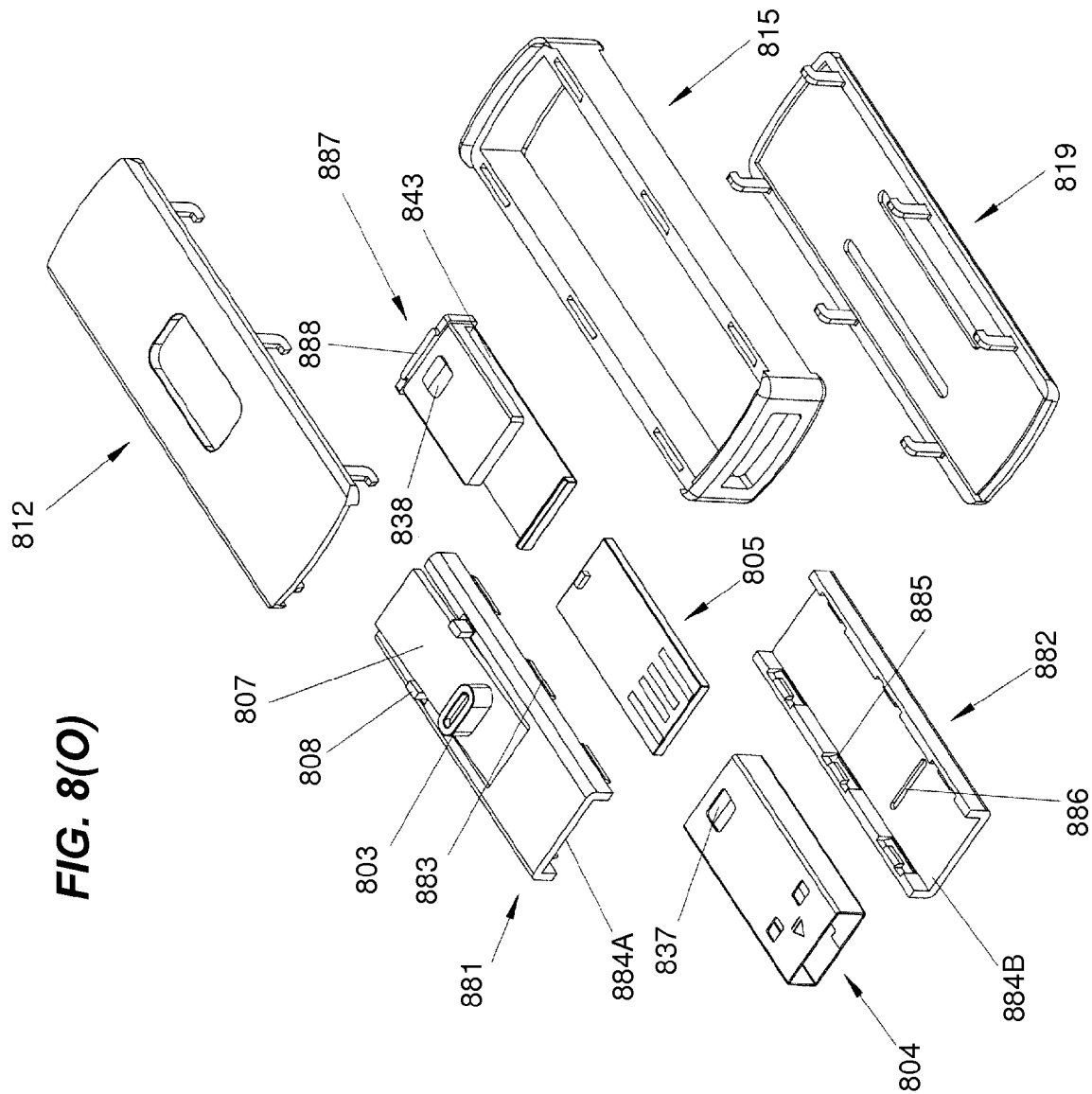
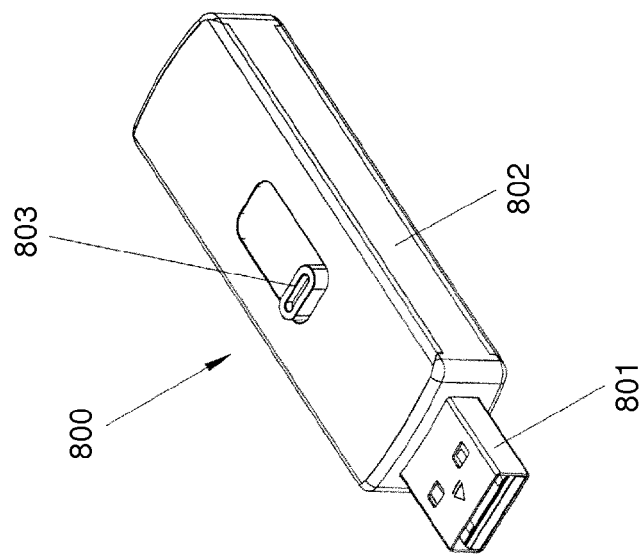

MLC COB USB FLASH MEMORY DEVICE WITH SLIDING PLUG CONNECTOR

CROSS-REFERENCE TO RELATED APPLICATIONS

This application is a continuation-in-part (CIP) of U.S. patent application for "Press/Push USB Flash Drive with Deploying and Retracting Functionalities with Elasticity Material and Fingerprint Verification Capability", Ser. No. 11/845,747, filed Aug. 27, 2007, and U.S. patent application for "A Press/Push Flash drive", Ser. No. 11/933,226, filed Oct. 31, 2007, and U.S. patent application for "Multi-Level-Cell (MLC) Slide Flash Memory Device, Ser. No. 12/050,748, filed Mar. 18, 2008.

This application is also a continuation-in-part (CIP) of co-pending U.S. patent application for "Single-Chip Multi-Media Card/Secure Digital controller Reading Power-on Boot Code from Integrated Flash Memory for User Storage", Ser. No. 12/128,916, filed on 29 May 2008, which is a continuation of U.S. patent application for the same title, Ser. No. 11/309,594, filed on 28 Aug. 2006, now issued as U.S. Pat. No. 7,383,362 on 3 Jun. 2008, which is a CIP of U.S. patent application for "Single-Chip USB Controller Reading Power-On Boot Code from Integrated Flash Memory for User Storage", Ser. No. 10/707,277, filed on 2 Dec. 2003, now issued as U.S. Pat. No. 7,103,684.

This application is a continuation-in-part (CIP) of co-pending U.S. patent application for "High Performance and Endurance Non-volatile Memory Based Storage Systems" Ser. No. 12/141,879 filed 18 Jun. 2008.

This application is a continuation-in-part (CIP) of co-pending U.S. patent application for "Flash Memory Devices with Security Features", Ser. No. 12/099,421, filed Apr. 8, 2008 which is a continuation-in-part (CIP) of co-pending U.S. patent application for "Methods and Systems of Managing Memory Addresses in a Large Capacity Multi-Level Cell (MLC) based flash memory device", Ser. No. 12/025,706, filed Feb. 4, 2008.

This application is also a CIP of U.S. patent application for "Electronic Data Storage Medium with Fingerprint Verification Capability", Ser. No. 11/624,667, filed Jan. 18, 2007.

This application relates to U.S. patent application for "Portable Computer Peripheral Apparatus with Retractable Plug Connector", U.S. Pat. No. 7,004,780. The disclosure of the above-identified U.S. patent applications and patents is incorporated by reference herein in its entirety.

FIELD OF THE INVENTION

The invention relates to flash memory devices, more particularly to systems and methods of managing memory addresses in a large capacity multi-level cell (MLC) based flash memory device.

BACKGROUND OF THE INVENTION

As flash memory technology becomes more advanced, flash memory is replacing traditional magnetic disks as storage media for mobile systems. Flash memory has significant advantages over floppy disks or magnetic hard disks such as having high-G resistance and low power dissipation. Because of the smaller physical size of flash memory, they are also more conducive to mobile systems. Accordingly, the flash memory trend has been growing because of its compatibility with mobile systems and low-power feature. However, advances in flash technology have created a greater variety of flash memory device types that vary for reasons of performance, cost and capacity. As such, a problem arises when mobile systems that are designed for one type of flash memory are constructed using another, incompatible type of flash memory.

New generation personal computer (PC) card technologies have been developed that combine flash memory with architecture that is compatible with the Universal Serial Bus (USB) standard. This has further fueled the flash memory trend because the USB standard is easy to implement and is popular with PC users. In addition, flash memory is replacing floppy disks because flash memory provides higher storage capacity and faster access speeds than floppy drives.

In addition to the limitations introduced by the USB standard, there are inherent limitations with flash memory. First, flash memory sectors that have already been programmed must be erased before being reprogrammed. Also, flash memory sectors have a limited life span; i.e., they can be erased only a limited number of times before failure. Accordingly, flash memory access is slow due to the erase-before-write nature and ongoing erasing will damage the flash memory sectors over time.

To address the speed problems with USB-standard flash memory, hardware and firmware utilize existing small computer systems interface (SCSI) protocols so that flash memory can function as mass-storage devices similarly to magnetic hard disks. SCSI protocols have been used in USB-standard mass-storage devices long before flash memory devices have been widely adopted as storage media. Accordingly, the USB standard has incorporated traditional SCSI protocols to manage flash memory.

As the demands for larger capacity storage increase, the flash memory device needs to keep up. Instead of using single-level cell flash memory, which stores one-bit of information per cell, multi-level cell (MLC) flash memory is used. The MLC flash memory allows at least two bits per cell. However, there are a number of problems associated with the MLC flash memory. First, the MLC flash memory has a low reliability. Secondly, the MLC flash memory data programming rules require writing to an ascending page in the same block or writing to a blank new page if there are data existed in the original page. Finally, a larger capacity requires a large logical-to-physical address look up table. In the prior art approach, the size look up table is in direct portion with the capacity of the flash memory. This creates a huge problem not only to the cost, but also to the physical size of the flash memory device. Furthermore, the traditional usage of the flash memory devices is generally in a very clean and relatively mild environment, thus the packaging design such as enclosure of the flash memory device is not suitable for hostile environment such as military and heavy industrial applications.

Therefore, it would be desirable to have improved methods and systems of managing memory addresses in a large capacity multi-level cell (MLC) flash memory device.

BRIEF SUMMARY OF THE INVENTION

Briefly, a portable USB flash memory device is disclosed to include a Chip-On-Board COB Printed Circuit Board Assembly PCBA inside. The flash memory device is enclosed inside a housing structure with a sliding button to deploy the USB plug connector external to the housing structure. The flash memory device with Multi-Level-Cell MLC compatible is being able to connect to a host with a Universal Serial Bus USB interface.

These and other objects and advantages of the present invention will no doubt become apparent to those skilled in the art after having read the following detailed description of the preferred embodiments illustrated in the several figures of the drawing.

BRIEF DESCRIPTION OF THE DRAWINGS

These and other features, aspects, and advantages of the present invention will be better understood with regard to the following description, appended claims, and accompanying drawings as follows:

FIGS. 4A-4F collectively show exemplary data structures used for managing memory addresses of the flash memory of FIG. 2A in accordance with one embodiment of the present invention;

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "front", "back", "rear", "side", "middle", "upwards", and "downwards" are intended to provide relative positions for the purposes of description, and are not intended to designate an absolute frame of reference. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-8N. However, those skilled in the art will readily appreciate that the detailed description given herein with respect to these figures is for explanatory purposes as the invention extends beyond these limited embodiments.

Figure 1A:
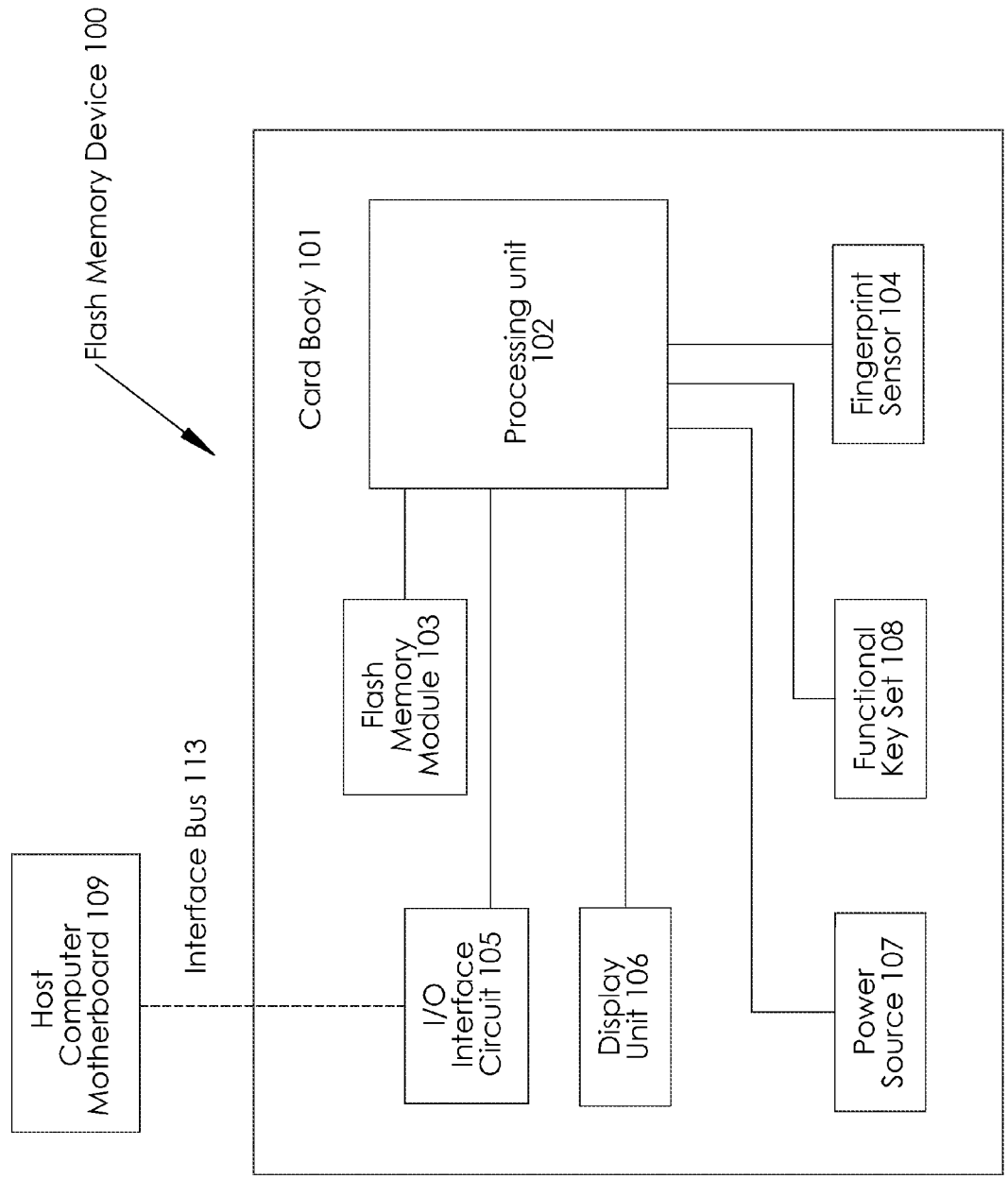
FIGS. 1A-1B are block diagrams showing two electronic environments, in which one embodiment of the present invention may be implemented in two respective exemplary electronic flash memory devices.
Figure 1B:
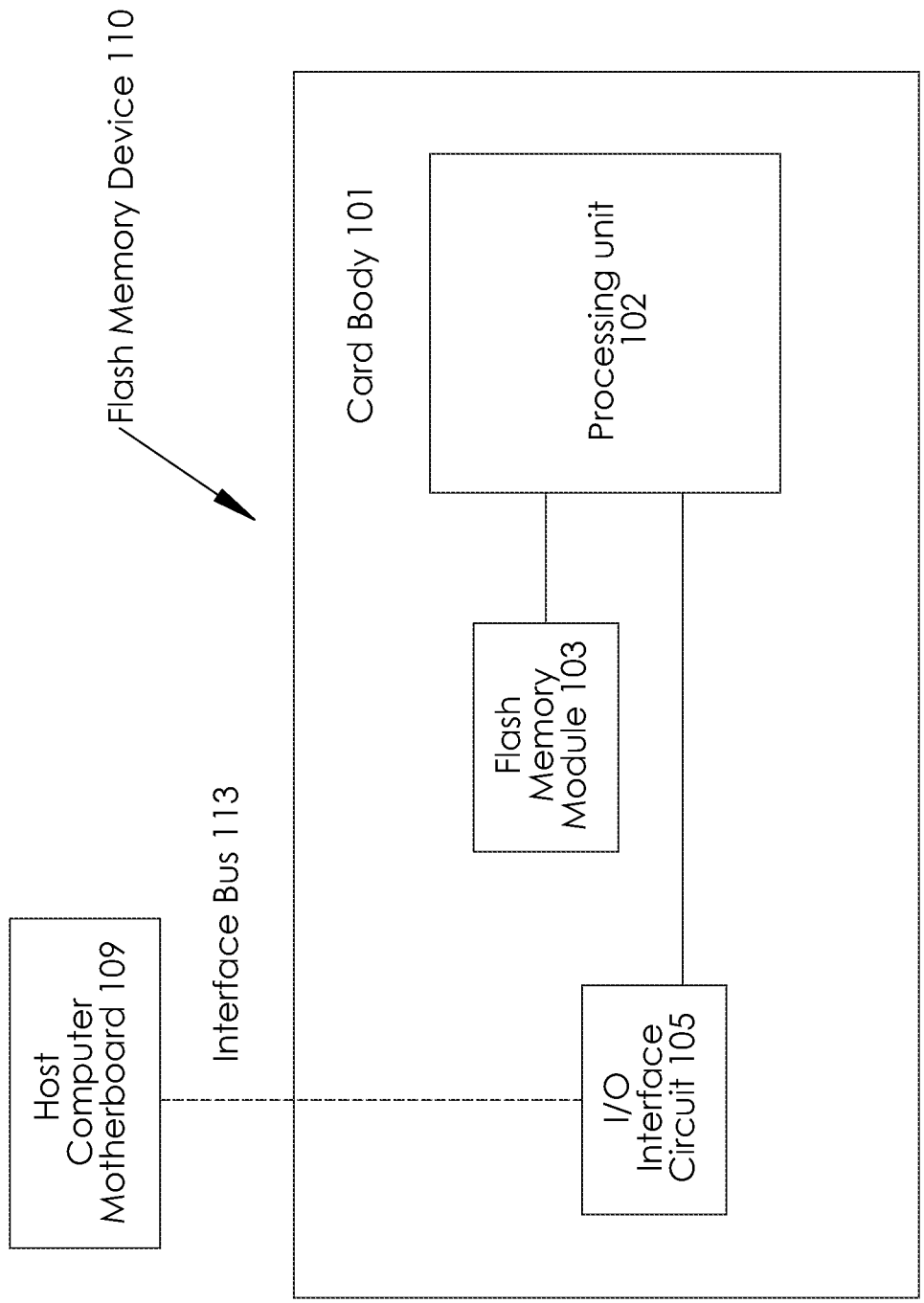

FIGS. 1A-1B are block diagrams illustrating two electronic environments, in which one embodiment of the present invention may be deployed in two respective exemplary electronic flash memory devices. Shown in FIG. 1A is a first electronic environment. A first flash memory device 100 is adapted to be accessed by a host computer motherboard 109 via an interface bus 113. The first flash memory device 100 includes a card body 101, a processing unit 102, at least one flash memory module 103, a fingerprint sensor 104, a Input/Output interface circuit 105, an optional display unit 106, an optional power source 107 (e.g., battery), and an optional function key set 108. The host computer motherboard 109 may include, but not be limited to, a desktop computer, a laptop computer, a cellular phone, a digital camera, a digital camcorder, a personal multimedia player.

The flash memory module 103 is mounted on the card body 101 which is a substrate for surface mount technology (SMT) manufacturing or a substrate for chip-on-board (COB) manufacturing, etc. The flash memory module 103 stores in a known manner therein one or more data files, a reference password, and a fingerprint reference data obtained by scanning a fingerprint of one or more authorized users of the flash memory device. Only the authorized users can access the stored data files. The data file can be a picture file or a text file.

The at least one flash memory module 103 may comprise one or more flash memory chips or integrated circuits. The flash memory chips may be single-level cell (SLC) or multi-level cell (MLC) based. In SLC flash memory, each cell holds one bit of information, while more than one bit (e.g., 2, 4 or more bits) are stored in a MLC flash memory cell. A detail data structure of an exemplary flash memory is described and shown in FIG. 2A and corresponding descriptions thereof.

The fingerprint sensor 104 is mounted on the card body 101, and is adapted to scan a fingerprint of a user of the first electronic flash memory device 100 to generate fingerprint scan data. Details of the fingerprint sensor 104 are shown and described in a co-inventor's U.S. patent Ser. No. 12/099/421, entitled "Flash Memory Devices with Security Features" issued on Apr. 8, 2008, the entire content of which is incorporated herein by reference.

The Input/Output interface circuit 105 is mounted on the card body 101, and can be activated so as to establish communication with the host computer motherboard 109 by way of an appropriate socket via an interface bus 113. In one embodiment, I/O interface circuit 105 includes circuits and control logic associated with a Universal Serial Bus (USB) interface structure that is connectable to an associated socket connected to or mounted on the host computer motherboard 109.

The processing unit 102 is mounted on the card body 101, and is coupled to the flash memory module 103, the fingerprint sensor 104 and the I/O interface circuit 105 by way of associated electrically conductive traces or wires disposed on the card body 101. In one embodiment, processing unit is one of an 8051, 8052, 80286 microprocessors available, for example, from Intel Corporation. In other embodiments, processing unit includes a RISC, ARM, MIPS or other digital signal processors (DSP). In accordance with an aspect of the present invention, processing unit 102 is controlled by a program stored at least partially in flash memory module 103 such that processing unit 102 is operable selectively in: (1) a programming mode, where the processing unit 102 activates the I/O interface circuit 105 to receive the data file from the host computer motherboard 109 and/or the fingerprint reference data from fingerprint sensor 104 under the control of the host computer motherboard 109, and store the data file and the fingerprint reference data in the flash memory module 103; (2) a data retrieving mode, where the processing unit 102 activates the I/O interface circuit 105 to transmit the data file stored in the flash memory module 103 to the host computer motherboard 109; and (3) a data resetting mode, where the data file and the fingerprint reference data are erased from the flash memory module 103. In operations, the host computer motherboard 109 sends write and requests to the flash memory device 100 via interface bus 113 and the I/O interface circuit 105 to the processing unit 102, which in turn utilizes a flash memory controller (not shown or embedded in the processing unit 102) to read from and/or write to the associated one or more flash memory modules 103. In one embodiment, for further security protection, the processing unit 102 automatically initiates operations in the data resetting mode upon detecting that a present time period has elapsed since the last authorized access of the data file stored in the flash memory module 103.

The optional power source 107 is mounted on the card body 101, and is connected to the processing unit 102 and other associated units on the card body 101 for supplying electrical power (to all card functions) thereto. The optional function key set, which is also mounted on the card body 101, is connected to the processing unit 102, and is operable so as to initiate operation of processing unit 102 in a selected one of the programming, data retrieving and data resetting modes. The function key set may be operable to provide an input password to the processing unit 102. The processing unit 102 compares the input password with the reference password stored in the flash memory module 103, and initiates authorized operation of the first flash memory device 100 upon verifying that the input password corresponds with the reference password. The optional display unit 106 is mounted on the card body 101, and is connected to and controlled by the processing unit 102 for displaying data exchanged with the host computer motherboard 109.

A second electronic environment is shown in a second environment in FIG. 1B. The second environment is very similar to the first environment as shown in FIG. 1A. The differences are the optional components (i.e., display unit 106, power source 107 and functional key set 108, fingerprint sensor 104) are not included in card body 101 of the second electronic flash memory device 110. Instead, such functionalities may be implemented using the existing ones provided by the host computer motherboard 109 via the interface bus 113. In this embodiment, the flash memory device 110 includes a PCBA in a form of COB package including flash memory modules and processing unit and/or other electronic components in small PCB area with MLC compatible.

The advantage of the second electronic environment in comparison with other prior art of electronic environments is a much simpler package in a form of a rigid enclosure COB package with smaller size than a standard PCBA package and easier to fabricate and build in manufacturing. The mechanical design and other alternatives will be described in FIGS. 8A to 8Q in details.

Figure 2A:
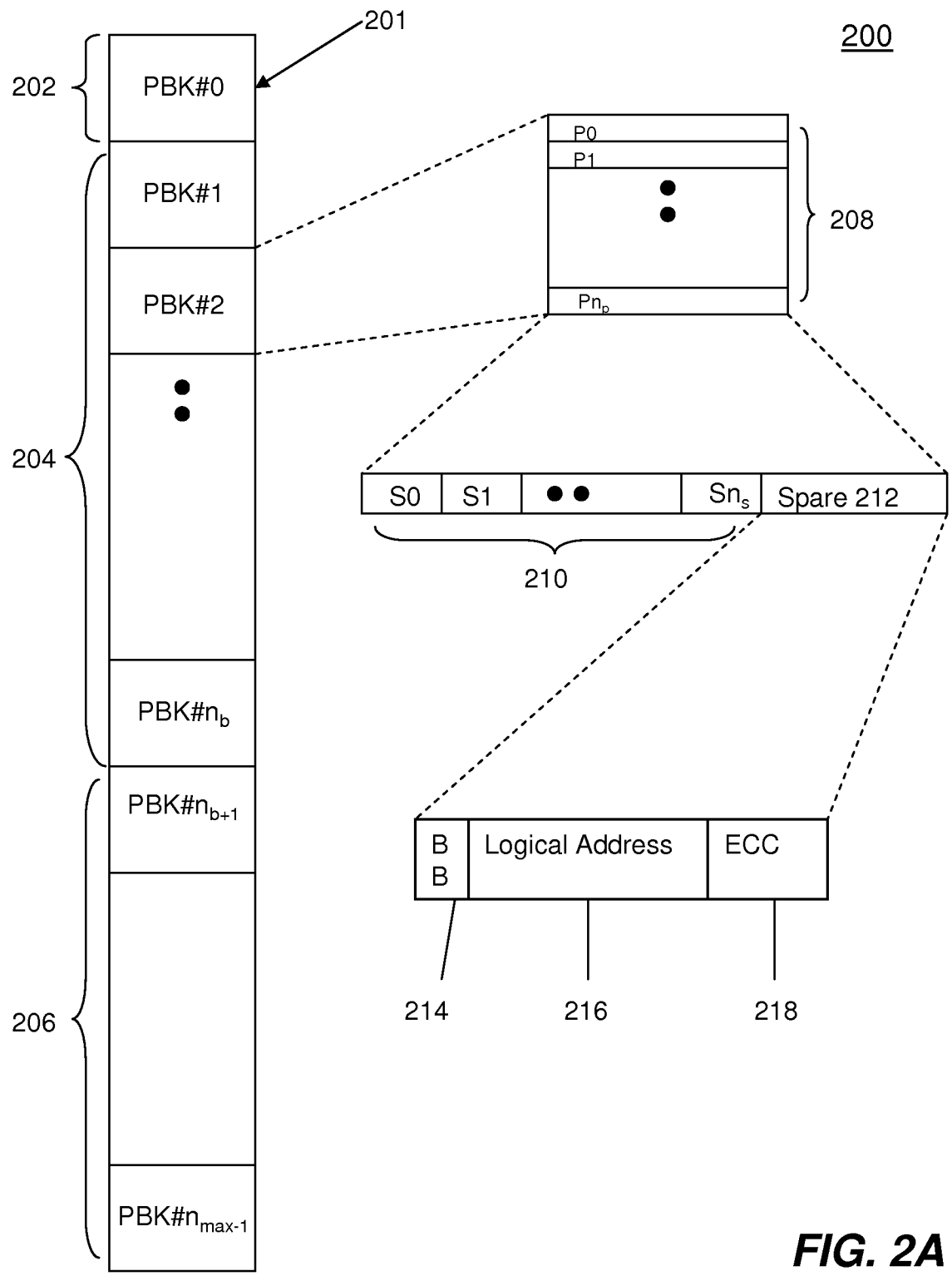
FIG. 2A is a diagram depicting a data structure of an exemplary large capacity flash memory, according one embodiment of the present invention.

Referring now to FIG. 2A, which is a diagram depicting an exemplary data structure 200 of a flash memory module 201 (e.g., flash memory module of FIG. 1B) in accordance with one embodiment of the present invention. The flash memory module 201 is divided into a plurality of physical blocks e.g., PBK#0, PBK#1, PBK#2, . . . ). In general, there are three categories of physical blocks: 1) the first block 202 (i.e., PBK#0); 2) normal usage data blocks 204 (i.e., PBK#1, PBK#2, PBK#$n_b$); and 3) reserved blocks 206 (i.e., PBK#$n_{b+1}$, PBK#$n_{max-1}$). The first block (PBK#0) 202 is guaranteed to be a good block and used by the manufacturer to store certain information such as Flash Timing Parameter (FTP), and other information by Initial Manufacturing Program (IMP), which cannot be alter by users. The manufacturer may define a percentage (e.g., 95%) of the total capacity as normal usage data blocks and the rest as reserved. The normal usage data blocks 204 are configured for user to store user data, although the first block (i.e., PBK#1) of the normal usage data blocks 204 is generally used for storing Master Boot Record (MBR), which contains critical data for operation of a computing device. Lastly, the reserved blocks 206 are configured to be accessed by a program module (e.g., FW) via special memory addresses in accordance with one embodiment of the present invention. Examples of the special memory address are 0xFFFF0000, 0xFFFF0001, 0xFFFFFF00, 0xFFFFFF01, etc.

Each block is further divided into a plurality of pages 208 (e.g., P0, P1, Pn$_p$). Each of the pages 208 includes a data area 210 and a spare area 212. The data area is partitioned into a plurality of sectors (e.g., S0, S1, Sn$_s$). In one embodiment, each sector stores 512-byte of data. The spare area 212 is configured to provide three different fields: 1) a block indicator (BB) 214, a logical address area 216 and an error correction code (ECC) area 218. When a block is tested no good by the manufacturer, the block indicator 214 of that block is set to a special code to indicate a bad block that cannot be used. The logical address area 216 is configured for identifying of that particular physical block for initialization of the flash memory device. More details are described in FIG. 4E and FIG. 4F for the reserved physical blocks as used by an embodiment of the present invention. Detailed processes of initialization are shown in FIGS. 7A-7E. The ECC area 218 is configured to store the ECC for ensuring data integrity.

In order to access the data stored in the normal usage blocks 204 of the flash memory module 201, the host computer motherboard 109 transmits a data transaction request (e.g., data read or write) along with a logical sector address (LSA) to the flash memory device (e.g., flash memory device of FIG. 1B). The processing unit of the flash memory device converts the received LSA into a physical address (i.e., specific block, page and sector numbers) before any data transaction can be performed. Traditionally, the conversion is performed by an address look up table with a one-to-one relationship to the physical address. This solution works for a flash memory device with relatively small capacity, because the address look up table is implemented with a static random access memory (SRAM). It would not be feasible in terms of cost and physical space to include SRAM that grows linearly as the capacity of the flash memory device especially for a large capacity MLC based flash memory device. For example, a large capacity (say 32 Giga-Byte (GB)) MLC based flash memory device using 2112-byte page (i.e., 2048-byte data plus 64-byte spare) and 128 pages per block, it would require more than 2 MB bytes of SRAM to hold the entire address look up table.

Figure 2B:
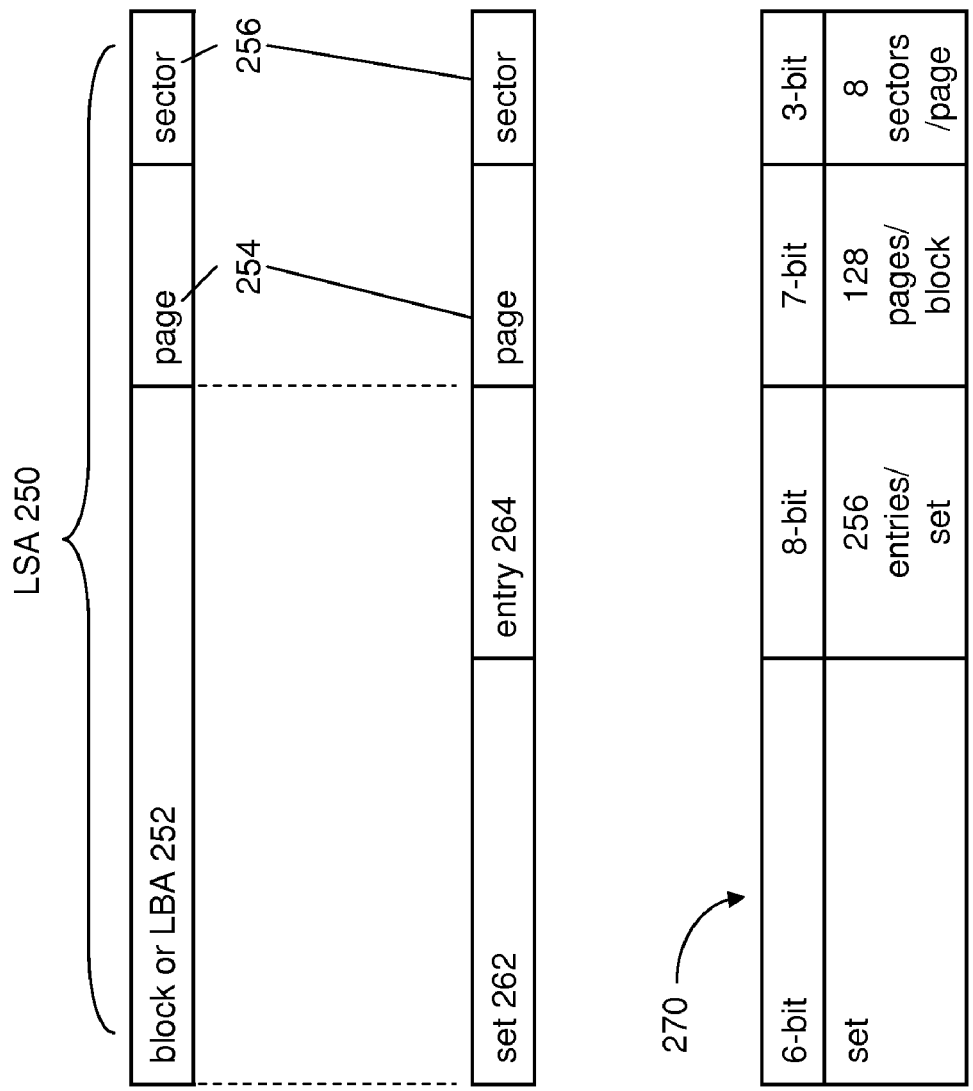
FIG. 2B is a diagram showing an exemplary scheme for partitioning a logical sector address in accordance with one embodiment of the present invention.

FIG. 2B is a diagram showing an exemplary scheme for partitioning a logical sector address in accordance with one embodiment of the present invention. A logical sector address (LSA) 250 is traditionally partitioned as three parts: block 252, page 254 and sector 256. The block portion 252 is also referred to as logical block address (LBA). According to one aspect of the present invention, the LSA 250 is partitioned into four parts: set 262, entry 264, page 254 and sector 256. The page 254 and sector 256 remain the same. And the block 252 is further partitioned into two parts: the set 262 and the entry 264. In other words, instead of just using block 252 as basic unit, the blocks are divided into a plurality of sets 262. Each of the sets 262 includes a plurality of entries 264. For example, if a 24-bit LSA 270 is partitioned in the following manner: 6-bit for set, 8-bit for entry, 8-bit for page and 3-bit for sector, the LSA 270 could represent up to 64 sets of 256 entries (i.e., 16,384 blocks) with each block containing 128 pages and each page containing 8 sectors of 512-byte of data. In this document, the number of the plurality of sets is N, where N is a positive integer.

To carry out the address partition scheme of the present invention, the manufacturer may predefine number of sets and entries in the first physical block (i.e., PBK#0) by the IMP. Instead of mapping all of the logical sector addresses (LSA) to a physical address in a memory, only a portion of the LSA (i.e., a set) is included such that only a limited size of memory is required for address correlation and page usage information. In other words, a limited size memory is configured to hold one set of entries with each entry including an address of the corresponding physical block and a plurality of corresponding page usage flags (see FIG. 4A for details). For example, 18-byte (i.e., 2-byte for the physical block address plus 128-bit or 16-byte for 128 page usage flags) is required for each entry, hence a total of 4608-byte of memory is required for a set with 256 entries.

However, in order to correlate a logical block address to a unique physical block, every entry in each of the plurality of sets must correlate to a unique physical address and a set of page usage flags. Since the limited size memory only has capacity of holding one set of such information, an embodiment of the present invention requires that information of all of the plurality of sets be stored in reserved area 206 of the flash memory 201. Only a relevant set of the plurality of sets is loaded into the limited size memory in response to a particular data transfer request from a host computer system. The relevant set is defined as the set with one of the entries matches the entry number derived from the LSA associated with the received data transfer request.

Since there are N sets of address correlation and page usage information stored in the flash memory, each of the N sets is referred to as a partial logical-to-physical address and page usage information (hereinafter 'PLTPPUI') appended with a set number (e.g., 'PLTPPUI0', 'PLTPPUI1', 'PLTPPUIN').

In order to simplify the examples and drawings in the Specification, an example with small numbers is used for demonstrate the relationship between LSA, LBA, sector, page, entry and set numbers. Those of ordinary skill in the art will understand implementation of an embodiment of the present invention can be with larger numbers. The following example uses a flash memory with four sectors per page, four pages per block and four entries per set and a logical sector address 159 (i.e., LSA=159) is represented by a binary number "10 01 11 11". As a result, the least significant four bits of LSA represent sector and page numbers with the two lowest bits for the sector number and the next two for the page number, as each two-bit represents four distinct choices—0, 1, 2 and 3. After truncating the four least significant bits of LSA, the remaining address becomes the corresponding logical block address (LBA). In this example, LBA has a binary value of '1001'. Because there are four entries per set in this example, two least significant bits of LBA represent the entry number (i.e., offset number in each set). The remaining high bits of LBA represent the set number. A summary of this example is listed in Table 1.

TABLE 1

| 10 | 01 | 11 | 11 |
|---|---|---|---|
| Set Number | Entry Number | Page Number | Sector Number |

According to one aspect of the present invention, an indexing scheme enables the processing unit to translate logical sector addresses (LSAs) and/or logical block addresses (LBAs) provided, in conjunction with a data transfer request, by the host computing motherboard to physical block numbers or addresses (PBK#) in the flash memory device. The indexing scheme comprises a plurality of sets of PLTPPUI and physical characteristics of the flash memory such as total number of sets, entries, pages and sectors. And ratios among the set, entry, page and sector. The processing unit can utilize the indexing scheme to determine which sectors of the flash memory are available for each particular data transfer request.

Figure 3:
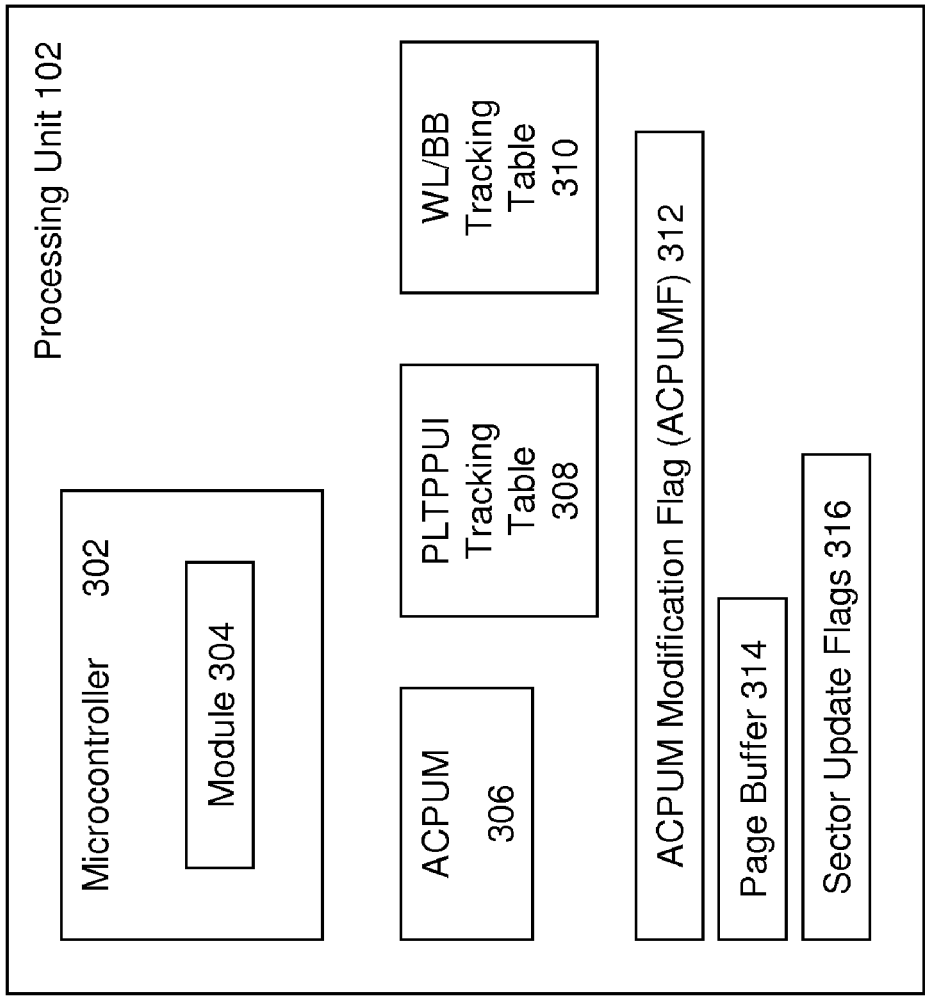
FIG. 3 is a simplified block diagram illustrating salient components of an exemplary processing unit of each of the electronic flash memory devices of FIGS. 1A-1C, according to an embodiment of the present invention.
Figure 4A:
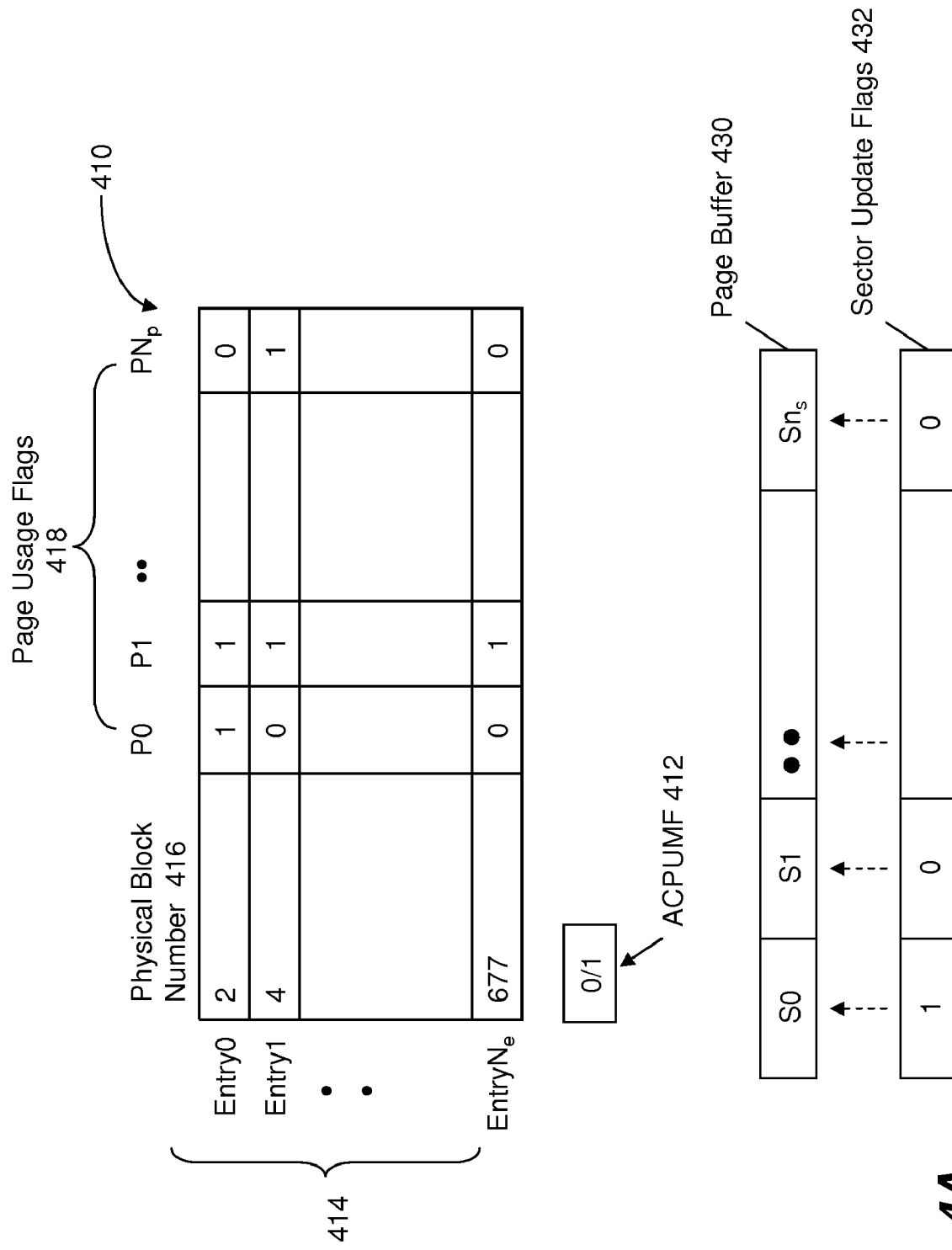
Figure 4B:
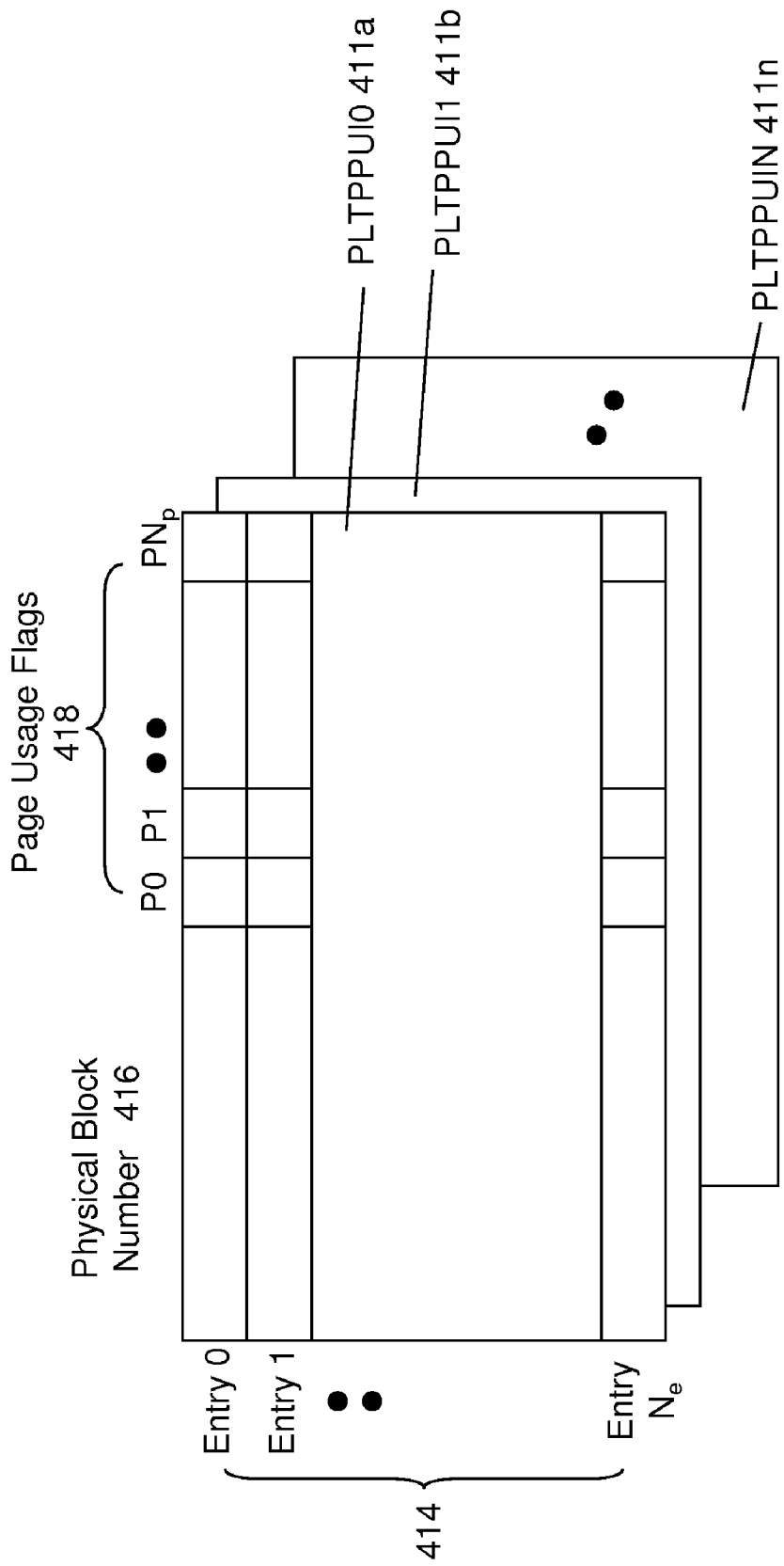

FIG. 3 is a simplified block diagram showing salient components of the process unit of an electronic flash memory device (e.g., flash memory devices of FIG. 1B) in accordance with one embodiment of the present invention. The processing unit comprises a microcontroller or microprocessor 302, an address correlation and page usage memory (ACPUM) 306, a PLTPPUI tracking table 308, a wear leveling and bad block (WL/BB) tracking table 310, a ACPUM modification flag (ACPUMF) 312, a page buffer 314 and a set of sector update flags 316.

The microcontroller 302 with a flash memory controlling program module 304 (e.g., a firmware (FW)) installed thereon is configured to control the data transfer between the host computer motherboard 109 and the at least one flash memory module. The ACPUM 306 is configured to provide an address correlation table, which contains a plurality of entries, each represents a correlation between a partial logical block address (i.e., entries) to the corresponding physical block number. In addition, a set of page usage flags associated with the physical block is also included in each entry. The ACPUM 306 represents only one of the N sets of PLTPPUI, which is stored in the reserved area of the flash memory. In order to keep tracking the physical location (i.e., physical block number) of each of the N sets of PLTPPUI, the physical location is stored in the PLTPPUI tracking table 308. Each item is the PLTPPUI tracking table 308 corresponds a first special logical address to one of the N sets of PLTPPUI. The wear leveling counters and bad block indicator for each physical block is stored in a number of physical blocks referred by corresponding second special logical addresses (e.g., '0xFFFFFF00'). The WL/BB tracking table 310 is configured to store physical block numbers that are assigned or allocated for storing these physical block wear leveling counters and bad blocks. The ACPUM modification flag (ACPUMF) 312 is configured to hold an indicator bit that tracks whether the ACPUM 306 has been modified or not. The page buffer 314 is configured to hold data in a data transfer request. The page buffer 314 has a size equaling to the page size of the flash memory 201. The sector update flags 316 are configured to hold valid data flag for each of the corresponding sectors written into data area of the page buffer 314. For example, four sector update flags are be required for a page buffer comprising four sectors. The page buffer 314 also includes a spare area for holding other vital information such as error correction code (ECC) for ensuring data integrity of the flash memory.

FIGS. 4A-4F collectively show exemplary data structures used for managing memory addresses of the flash memory of FIG. 2A in accordance with one embodiment of the present invention. The ACPUM data structure 410 contains $N_e$ rows of entries 414, where $N_e$ is a positive integer. Each row contains a physical block number or address (PBK#) 416 and a plurality of page usage flags 418 associated with the PBK#. The number of pages ($N_e$) is determined by the physical flash memory cell structure and defined by the IMP. ACPUMF 412 contains one bit, which is a toggle switch representing whether the ACPUM 306 has been modified or not. The ACPUMF 412 may be implemented as a register containing either 0 (not modified) or 1 (modified). The page buffer 430 includes a data area containing plurality of sectors (S1, S2, . . . , $Sn_s$) and a spare area (not shown in FIG. 4A) containing other information such as ECC. A set of sector update flags 432 is configured to represent respective sectors in the page buffer 430. Each of the sector update flags 432 indicates either a corresponding sector contains a valid data or not. In one implementation, valid data is represented as "1", while initial or stale state as "0". These flags may be implemented in a different logic such as reversing the binary representation. As discussed in the prior sections and shown in FIG. 4B, there are N sets of PLTPPUI 411*a-n*, where N is a positive integer. The N sets of PLTPPUI 411*a-n* represent all of the logical blocks in correlation with physical blocks. Only one of the N sets is loaded into the ACPUM 306 at one time.

Each set of the PLTPPUI is stored in the reserved area 206 of the flash memory 201 of FIG. 2A in a data structure 420 shown in FIG. 4C. The contents of each set of PLTPPUI are stored in one page of a physical block. For example, the PLTPPUI0 is stored at one of a plurality of first special logical addresses "0xFFFF0000", which corresponds to the first page (P0) 424*a* of a physical block 'PBK#1000' 422 initially. Due to the MLC flash memory data programming rules, each page can only be programmed or written once (i.e., NOP=1) and data programming within one block can only be in a ascending page order. The second data programming or write can only be into the second page (P1) 424*b* until the $n^{th}$ write to the last page (Pn) 424*n* of the block 'PBK#1000' 422. After that, the next data programming, the $(n+1)^{th}$ write, must be written to the first page (P0) 434 of a new physical block (PBK#1012) 432 just assigned or allocated according to the WL rules. In storing ACPUM 306 into the flash memory, each entry of the ACPUM 306 is written sequentially in the data area 425 of the page. When a first page of a new block is programmed, after the data area has been written, other vital information is written into the spare area 426. The other information include at least the following: a bad block indicator 427, the special logical address 428 issued by the FW for each of the N sets of PLTPPUI and a tracking number 429 for each special logical address. The bad block indicator 427 showing 'FF' means a good block. The first special logical address 442 may be '0xFFFF0000'. And the tracking number (TN) 446 is set to zero for an initial physical block corresponding to each of the first special logical addresses. The tracking number 446 is incremented by one as a new block is assigned or allocated for storing a particular set of PLTPPUI.

FIG. 4D is a diagram illustrating an exemplary data structure 440 of the PLTPPUI tracking table 308 of FIG. 3. The PLTPPUI tracking table 308 contains a plurality of rows representing a plurality of first special logical addresses 442, one for each of the N sets of PLTPPUI. Each of the N rows contains a physical block number 444, a tracking number (TN) 446 and highest page number 448. The first row of the PLTPPUI tracking table 308 corresponds to the example shown in FIG. 4C.

Similar to the data structure of the PLTPPUI tracking table, an exemplary data structure 450 of a WL/BB tracking table 310 is shown in FIG. 4E. Instead of first special logical addresses for each of the N sets of PLTPPUI, each row is for a second special address 452 of a block of the WL/BB tracking table 310. In one implementation, the second special address 452 may be '0xFFFFFFF0'. An exemplary data structure 460 for storing the WL/BB tracking table in the reserved area of a flash memory is shown in FIG. 4F. Similarly, the MLC flash memory data programming rules dictate the data to be written to a new page for each update. The spare area stores the block indicator 467, the second special logical address 452 and tracking number 456.

Referring now to FIGS. 5A-5E, which collectively show a flowchart illustrating an exemplary process 500 of conducting data transfer requests of the flash memory of FIG. 2A in accordance with one embodiment of the present invention. The process 500 is preferably understood in conjunction with previous figures and examples shown in FIGS. 6A-6D. The process 500 is performed by the microcontroller 302 with a flash memory controller program module 304 installed thereon.

The process 500 starts in an 'IDLE' state until the microcontroller 302 receives a data transfer request from a host (e.g., the host computing board of FIG. 1B) at 502. Also received in the data transfer request is a logical sector address (LSA), which indicates the location the host wishes to either read or write a sector of data (i.e., 512-byte sector). Based on the parameters defined by the IMP and the physical characteristics of the MLC based flash memory, the received LSA is processed to extract the set, entry, page and sector numbers (see Table 1 for an example) included therein. After the received LSA has been processed, the process 500 moves to decision 504. It is determined whether the ACPUM 306 has been loaded with a set of PLTPPUI that covers the received LSA. If 'yes', the process 500 reads out the physical block number (PBK#) corresponding to the entry number of the received LSA at 516 before moving to another decision 518, in which it is determined whether the data transfer request is read or write (i.e., program).

If the decision 504 is 'no', the process 500 moves to decision 506. The process 500 checks whether the contents of the page buffer 430 need to be stored. In one implementation, the process 500 checks the sector update flags 432 that correspond to sectors in the page buffer 430. If any one of the flags 432 has been set to 'valid', then the contents of the page buffer 430 must be stored to the corresponding page of the corresponding physical block of the MLC flash memory at 550 (i.e., the decision 506 is 'yes'). Detailed process of step 550 is shown and described in FIG. 5D. After the contents of the page buffer 430 have been stored, the process 500 sets the ACPUM modification flag (ACPUMF) 412 to a 'modified' status at 508. In other words, the ACPUM 306 has been modified and needs to be stored in the flash memory in the future. Then the process 500 moves to yet another decision 510.

Otherwise if 'no' at decision 506, the process 500 moves the decision 510 directly. It is then determined if the ACPUM 306 has been modified. If 'yes', the process 500 moves to 580, in which, the process 500 writes the contents of the ACPUM 306 to one of a plurality of first special logical addresses (e.g., '0xFFFF0000' for PLTPPUI0, or '0xFFFF0001' for PLTP-PUI1, etc.) for storing corresponding set of PLTPPUI in the reserved area of the flash memory. The ACPUM modification flag 412 is reset at the end of 580. Detailed process of step 580 is shown and described in FIG. 5E. Then, at 514, the process 500 loads a corresponding set of PLTPPUI to the ACPUM 306 from the flash memory based on the set number extracted from the received LSA. Once the ACPUM 306 has been loaded, the process 500 reads the physical block number that corresponds to the entry number at 516 before moving to decision 518. If 'no' at decision 510, the process 500 skips step 580 and goes directly to 514.

Figure 5A:
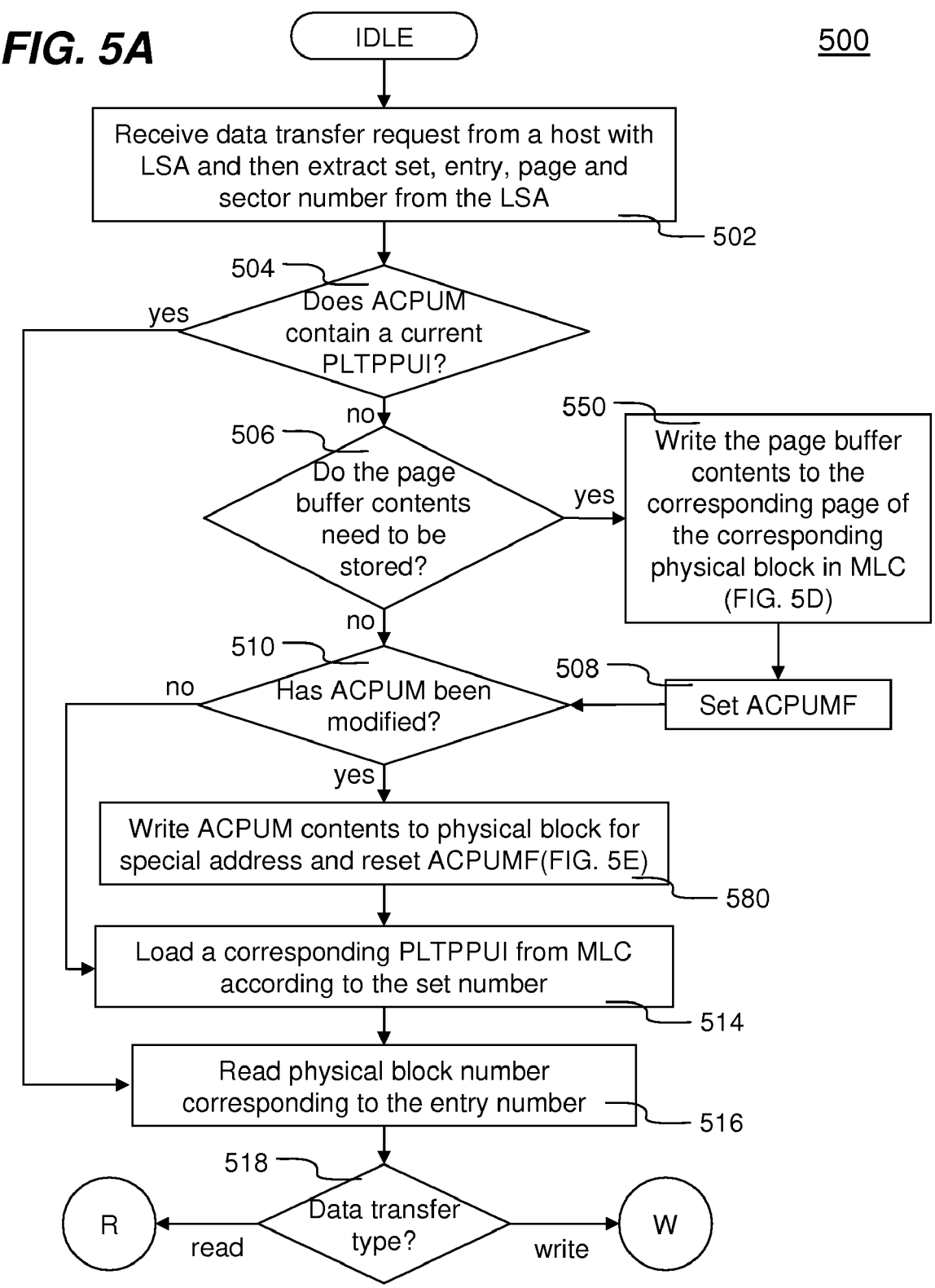
FIGS. 5A-5E collectively show a flow chart of an exemplary process of conducting data transfer requests of the flash memory of FIG. 2A in accordance with one embodiment of the present invention.
Figure 5B:
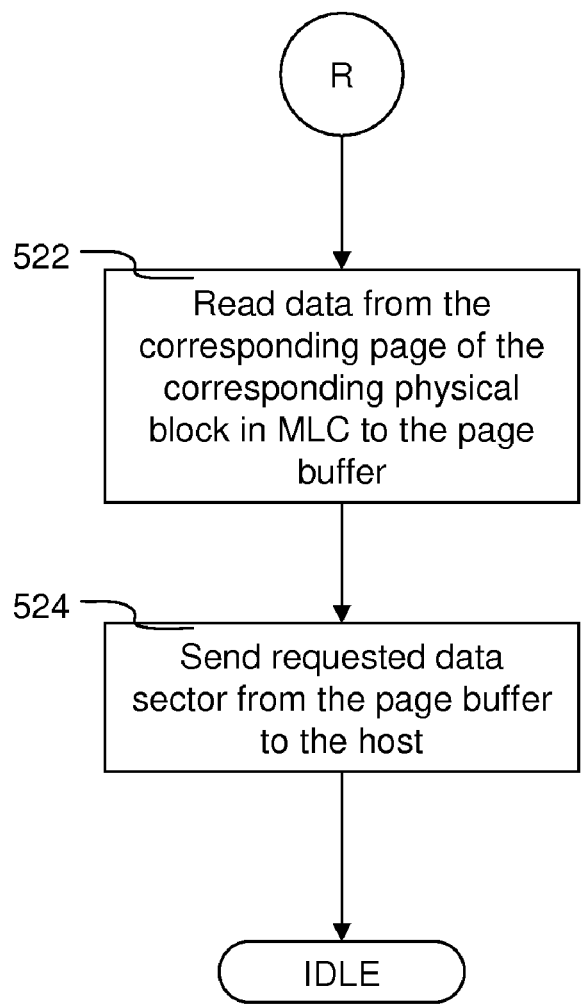

Next, at decision 518, if the data transfer request is a data read request, the process 500 continues with a sub-process 520 shown in FIG. 5B. The process 500 or sub-process 520 reads data from the corresponding page of the physical block in the flash memory to the page buffer 430. The corresponding page number is derived from the received LSA, and the physical block number is obtained through the ACPUM 306 for the entry numbers at 516. Finally, the process 500 sends the requested data sector from the page buffer 430 to the host 109 before going back the 'IDLE' status waiting for another data transfer request.

Figure 5C:
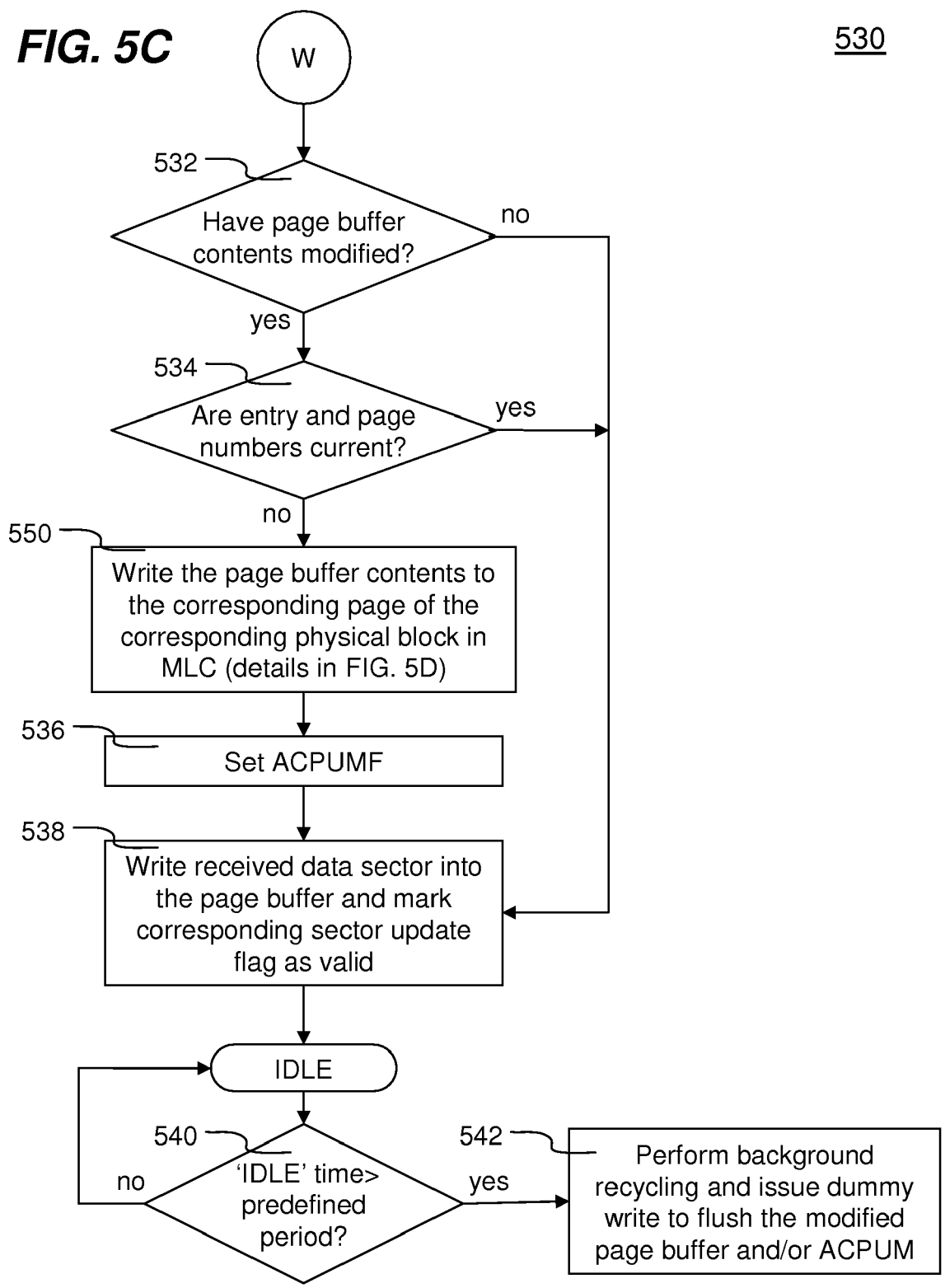

If the data transfer request is a data write or program request, the process 500 continues with a sub-process 530 shown in FIG. 5C. The process 500 or sub-process 530 moves to decision 532, in which it is determined whether the contents of the page buffer 430 have been modified. If 'no', the process 500 writes received data sector into the page buffer 430 according to the sector number derived from the received LSA, and marks the corresponding sector of the sector update flags 432 to indicate valid data in that particular sector has been written in the page buffer 430 at 538. The process 500 then moves back to the 'IDLE' state waiting for another data transfer request.

If 'yes' at decision 532, the process 500 moves to decision 534. It is determined if the received data sector is in the same entry and page numbers. If 'yes', the process 500 writes the received data sector to the page buffer 430 at 538 before going to the 'IDLE'. If 'no' at decision 534, the process 500 writes the page buffer contents to the corresponding page of the physical block of the flash memory at 550. Next, the process 500 sets the ACPUM modification flag 412 to a 'modified' status at 536. Next, at 538, the process 500 writes the received data sector to the page buffer before going back to the 'IDLE' state.

Finally, in additional to managing data read and write requests, the process 500 regularly performs a background physical block recycling process so that the blocks containing only stale data can be reused later. When the process 500 is in the 'IDLE' state, it performs test 540, in which it is determined if the idle time has exceeded a predefine time period. If 'yes', the process 500 performs the background recycling process, which may include issuing a dummy data write request to force the page buffer 430 and/or modified ACPUM 306 to be written to corresponding locations of the flash memory at 542. In one embodiment, the dummy data write/program command may be issued to rewrite some of seldom touched physical blocks, for example, physical blocks used for storing user application or system program modules.

Figure 5D:
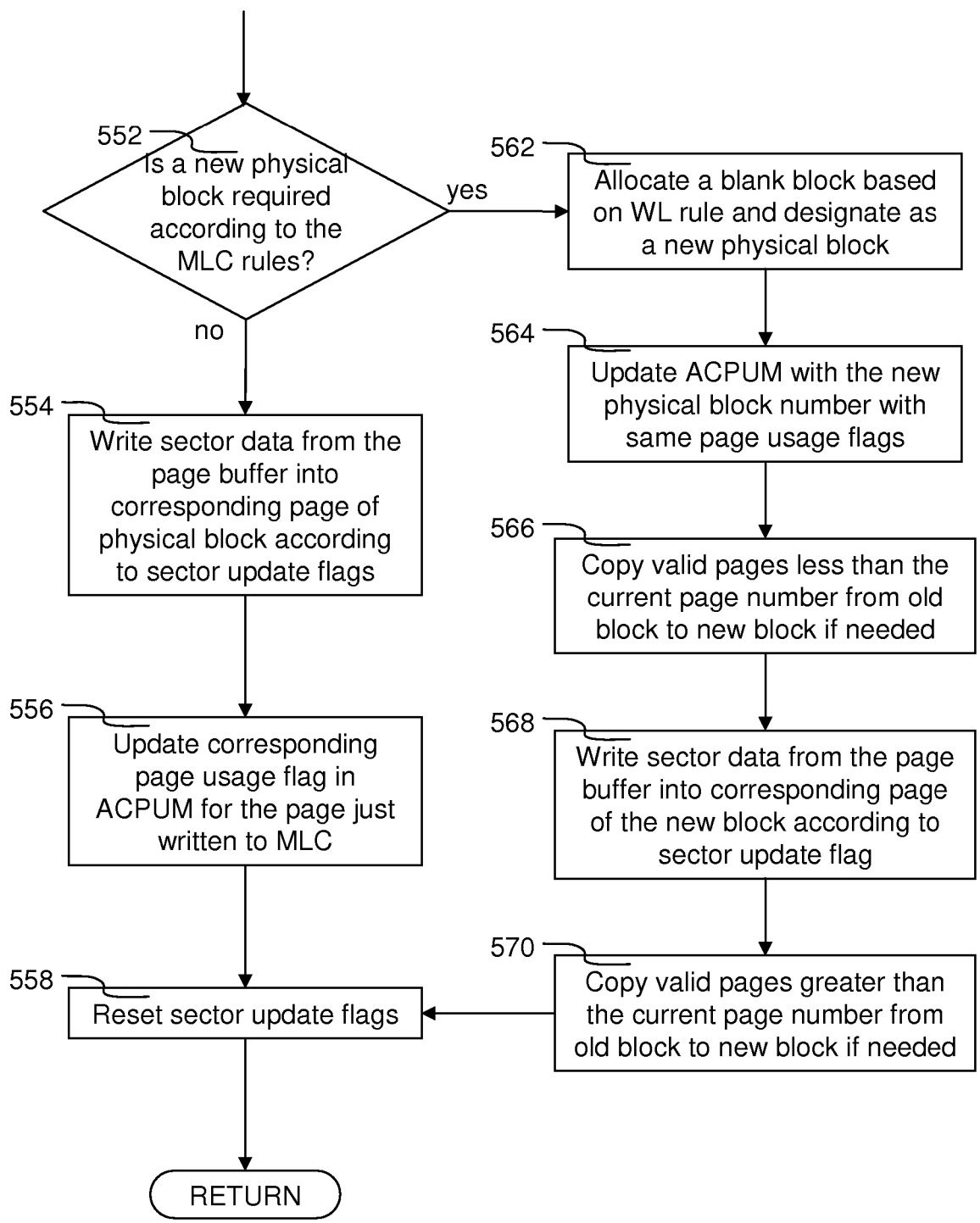

Referring to FIG. 5D, a detailed process of step 550 is shown. First, the process 500 is at decision 552, in which it is determined if a new blank physical block is required for storing the contents of the page buffer 430 based on the MLC based flash memory data programming rules. The rules are as follows: 1) each page can only be programmed once (conventionally referred to as 'NOP=1'); and 2) data programming is performed to a page of a same block in the ascending or sequential order, or each new page must have a high page number in the same block. If 'no' at decision 552, the process 500 writes valid data sectors based on the sector update flags 432 from the page buffer 430 to the page register of the corresponding page of the corresponding physical block of the flash memory at 554. Next, at 556, the process 500 updates the corresponding one of the page usage flags in the ACPUM 306 for the page just written to the flash memory. The process 500 then resets the sector update flags at 558 before returning.

If 'yes' at decision 552, the process 500 searches for a blank physical block based on the wear leveling (WL) rule; once found, the process 500 designates it as a new block at 562. Then, the process 500 updates the ACPUM 306 with the new physical block number for the entry number and keeps the page usage flags the same. It is noted that the entry number is derived from the received LSA. Next, at 566, the process 500 copies all valid pages with page number less than the current page number from the old to the new physical block if needed. The current page number if the page number derived from the received LSA. Then, the process 500 writes the valid data sectors based on the sector update flags 432 from the page buffer 430 to the page register of the corresponding page of the new physical block at 568. Finally if necessary, the process 500 copies all valid pages with page number greater than the current page number from the old to the new physical block at 570. The process 500 resets the sector update flags at 558 before returning.

Figure 5E:
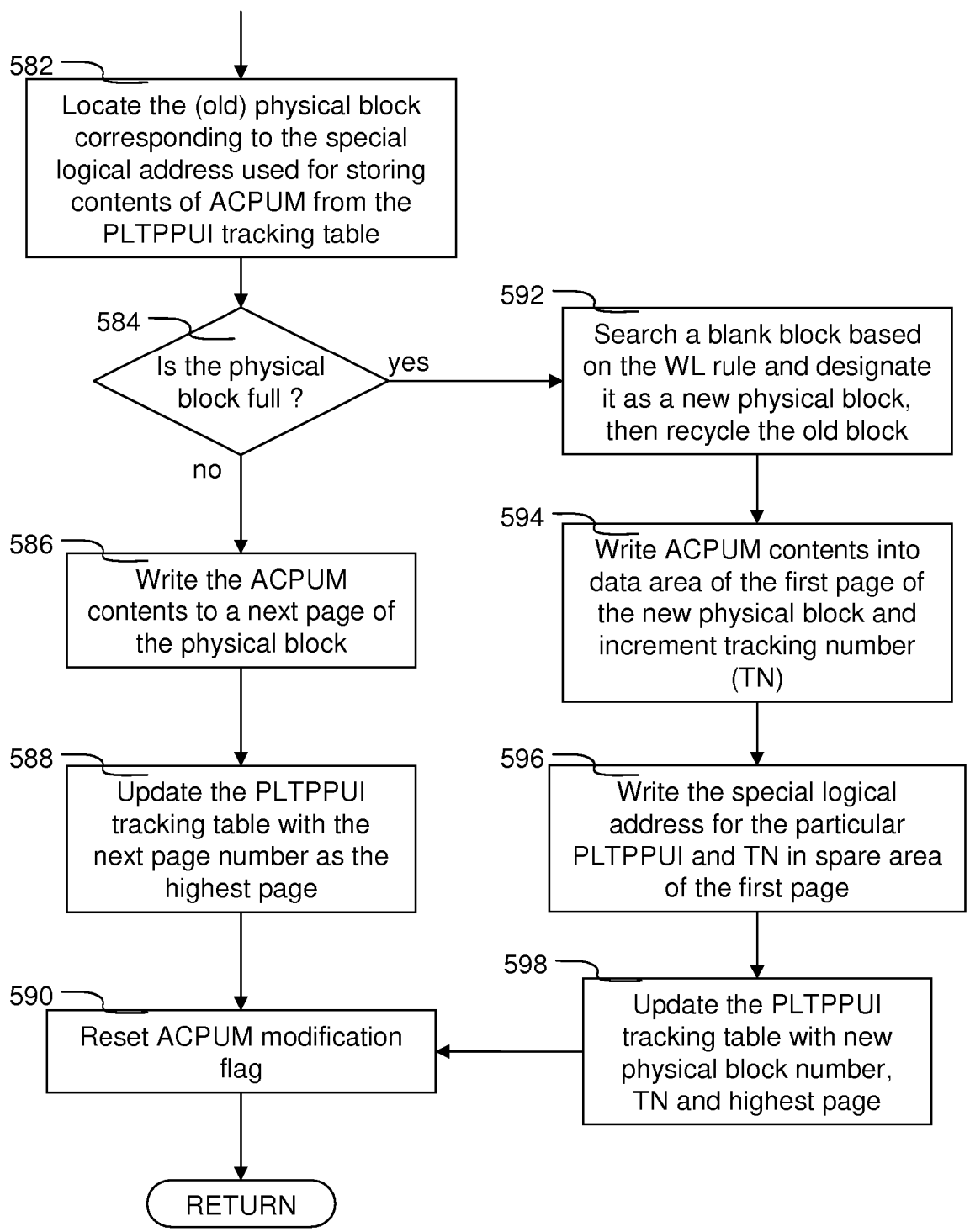

FIG. 5E is a flowchart illustrating step 580 of the process 500. First, in step 580, the process 500 locates the corresponding physical block in the reserved area of the flash memory using a particular one of the first special logical addresses from the PLTPPUI tracking table 308. The corresponding physical block is configured to store the contents of the current ACPUM 306, which is associated with the first special logical address, for example, '0xFFFF0000' for 'PLTPPUI0', '0xFFFF0001' for 'PLTPPUI1', etc. Next, at decision 584, it is determined whether the physical block is full or not. If 'no', the process 500 writes the contents of the ACPUM 306 to the next page in the physical block at 586. It is noted that the MLC based flash memory data programming rule dictates that only a new higher page in the same block is allowed to be programmed or written. Then the process 500 updates the PLTPPUI tracking table 308 to reflect that a new page has been written into the physical block by incrementing the highest page count 448 at 588. Finally, before returning at 590, the process 500 resets the ACPUM modification flag 412 to a 'not modified' status as the contents of the ACPUM 306 have been stored to the flash memory.

Referring back to decision 584, if 'yes', the process 500 searches a blank physical block as a new physical block (e.g., new physical block (PBK#1012) in FIG. 4C) in the reserved area of the flash memory based on the WL rule, and the old physical block (e.g. old physical block (PBK#1000) in FIG. 4C) is sent to a recycling queue for reuse at 592. Next, at 594, the process 500 writes the contents of the ACPUM 306 to the first page (e.g., 'P0' of FIG. 4C) of the new block. After the contents of the ACPUM have been stored in to the data area of the first page, the tracking number (TN) is incremented by one. Next, at 596, the first special logical address for this particular set of PTLPPUI and the new tracking number (TN) are written into the spare area of the first page. The process 500 then updates the PLTPPUI tracking table 308 with the new physical block number, the tracking number and the highest page number for the current set of PLTPPUI at 598. Before returning, the process 500 resets the ACPUM modification flag 412 to a 'not modified' status at 590.

FIGS. 6A-6D collectively show a sequence of data write or program requests to demonstrate the exemplary process 500 of FIGS. 5A-5E. In order to simplify the drawings and description, the sequence of the data write requests is perform on an exemplary flash memory with four sectors per page, four pages per block, and four entries per set. As a result of the simplified assumption, the logical sector address (LSA) 602 received along with the data write request can be processed in a scheme corresponding to Table 1. In other words, two least significant bits of the LSA represent the sector number, next two the page number, next two the entry number, and the remaining bits the set number.

The sequence of the data write requests starts with (a) writing to LSA=0, which corresponds to set 0 (i.e., PLTPPUI0), entry 0, page 0 and sector 0. PLTPPUI0 is loaded into ACUPUM 604, in which the first entry (i.e., entry 0) corresponds to physical block 'PBK#2' and page usage flags 606 are not set. The ACPUMF 614 is set to a 'un-modified' status. The sector data (S0) is written to the first sector of the page buffer 610 and the corresponding flag in the sector update flags 612 is set to a 'V' for valid data. The corresponding path in the process 500 for writing LSA=0 is as follows:
 (1) receiving an LSA=0 and extracting set, entry, page and set numbers at 502;
 (2) determining whether ACPUM contains a current set of PLTPPUI at 504 (yes, PLTPPUI0);
 (3) reading physical block number (PBK#2) at entry 0 at 516;
 (4) determining data transfer request type at 518 (write);
 (5) determining whether page buffer contents have been modified at 532 (no);
 (6) writing received data sector (S0) into the page buffer and marking corresponding sector ($1^{st}$) update flag at 538; and
 (7) going back to 'IDLE' for next data transfer request.

The next data write request (b) is to write to LSA=1. The corresponding path is the process 500 is as follows:
 (1) receiving an LSA=1 and extracting set, entry, page and set numbers at 502;
 (2) determining whether ACPUM contains a current set of PLTPPUI at 504 (yes, PLTPPUI0);
 (3) reading physical block number (PBK#2) at entry 0 at 516;
 (4) determining data transfer request type at 518 (write);
 (5) determining whether page buffer contents have been modified at 532 (yes);
 (6) determining whether page and block number current at 534 (yes);
 (7) writing received data sector (S1) into page buffer and marking corresponding sector ($2^{nd}$) update flag at 538; and
 (8) going back to 'IDLE' for next data transfer request.

Figure 6A:
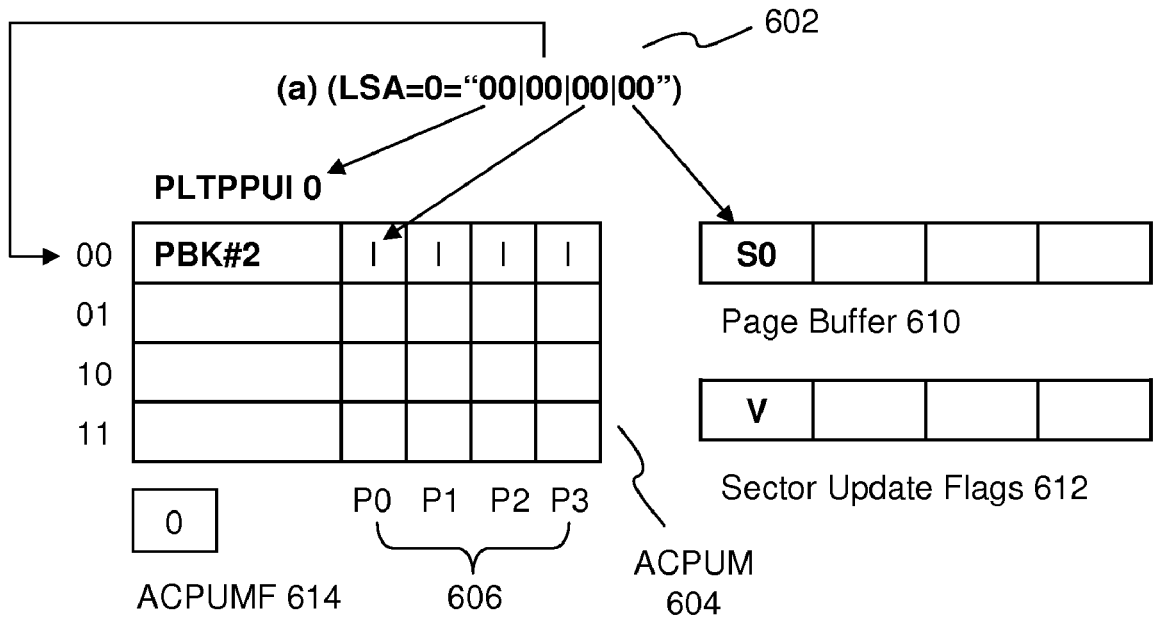
FIGS. 6A-6E collectively show a sequence of data write requests to demonstrate the exemplary process 500 of FIGS. 5A-5E.
Figure 6A:
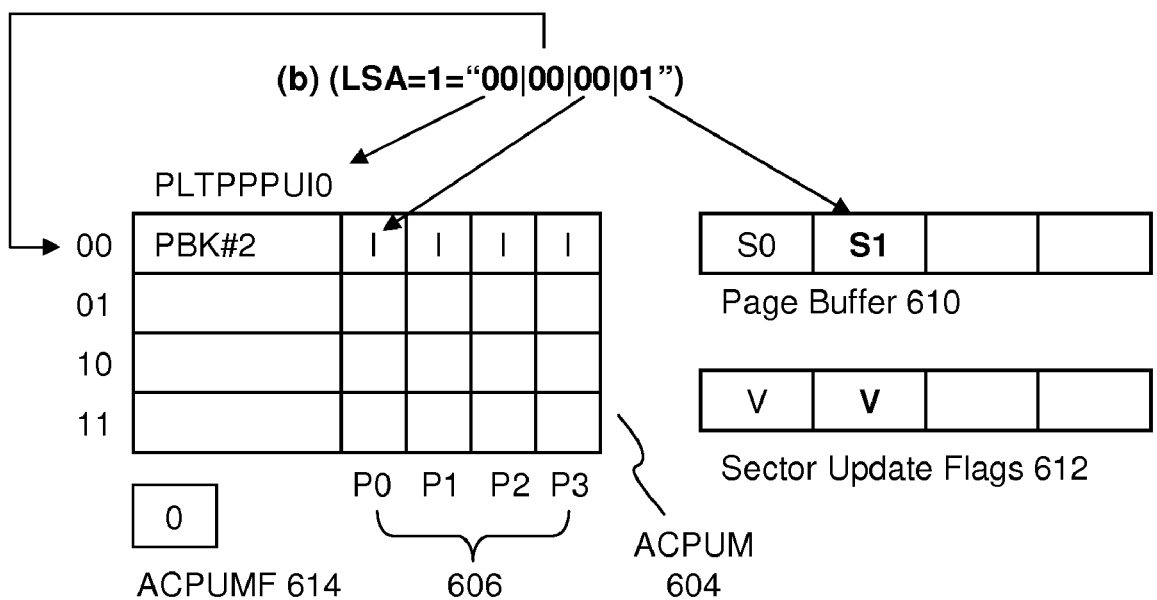
Figure 6B:
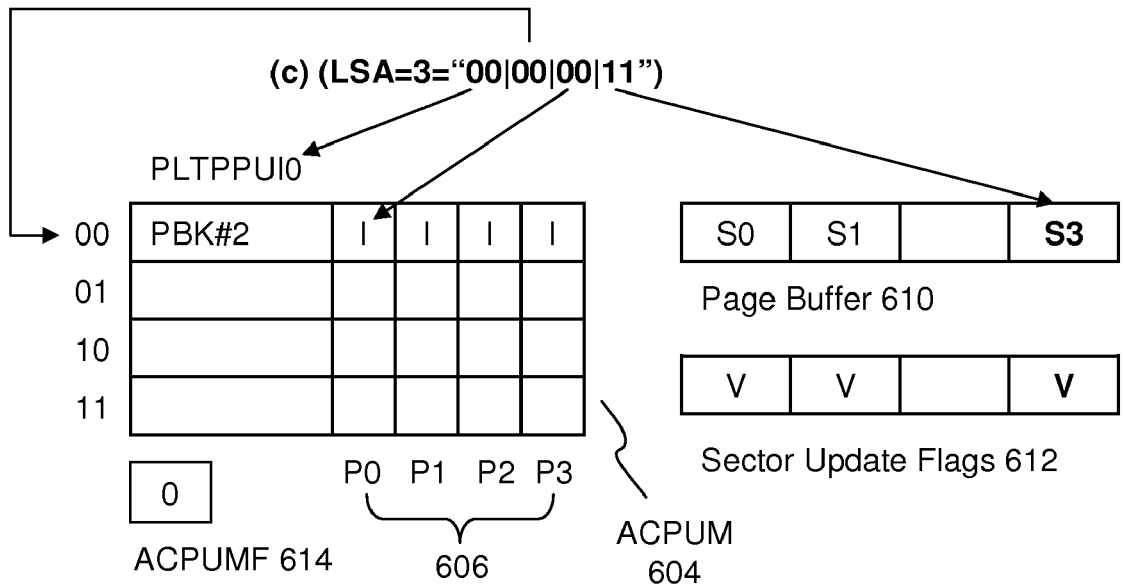
Figure 6B:
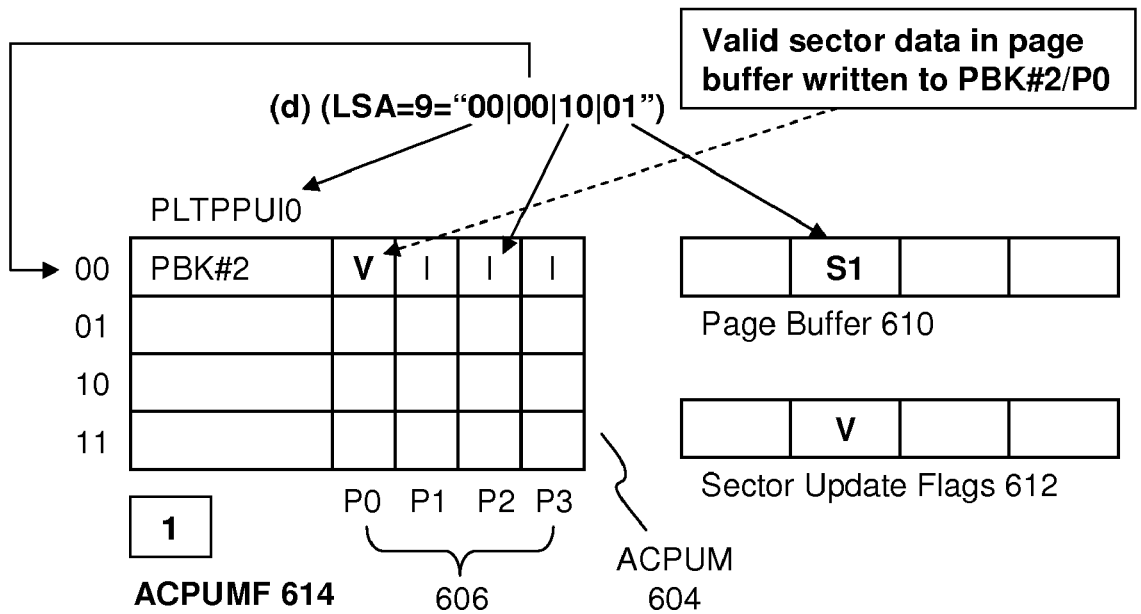

The next data write request (c) is to write to LSA=3 (FIG. 6B). The corresponding path is the process 500 is as follows:
 (1) receiving an LSA=3 and extracting set, entry, page and set numbers at 502;
 (2) determining whether ACPUM contains a current set of PLTPPUI at 504 (yes, PLTPPUI0);
 (3) reading physical block number (PBK#2) at entry 0 at 516;
 (4) determining data transfer request type at 518 (write);
 (5) determining whether page buffer contents have been modified at 532 (yes);
 (6) determining whether page and block number current at 534 (yes);
 (7) writing received data sector (S3) into the page buffer and marking corresponding sector ($4^{th}$) update flag at 538; and
 (8) going back to 'IDLE' for next data transfer request.

The next data write request (d) is to write to LSA=9 (FIG. 6B). The corresponding path is the process 500 is as follows:
 (1) receiving an LSA=9 and extracting set, entry, page and set numbers at 502;
 (2) determining whether ACPUM contains a current set of PLTPPUI at 504 (yes, PLTPPUI0);
 (3) reading physical block number (PBK#2) at entry 0 at 516;
 (4) determining data transfer request type at 518 (write);
 (5) determining whether page buffer contents have been modified at 532 (yes);
 (6) determining whether page and block number current at 534 (no, same block but different page);
 (7) writing the page buffer contents to the corresponding page (first page of PBK#2) at 550, which includes determining a new block is required at 552 (no); writing sector data to the first page of PBK#2 at 554; updating at the corresponding page usage flag (P0) in ACPUM at 556 and resetting sector update flags at 558;
 (8) setting the ACPUMF (i.e., 1 for 'modified') at 536; and
 (9) writing received data sector (S1) into the page buffer and marking corresponding sector ($2^{nd}$) update flag at 538 before going back to "IDLE".

Figure 6C:
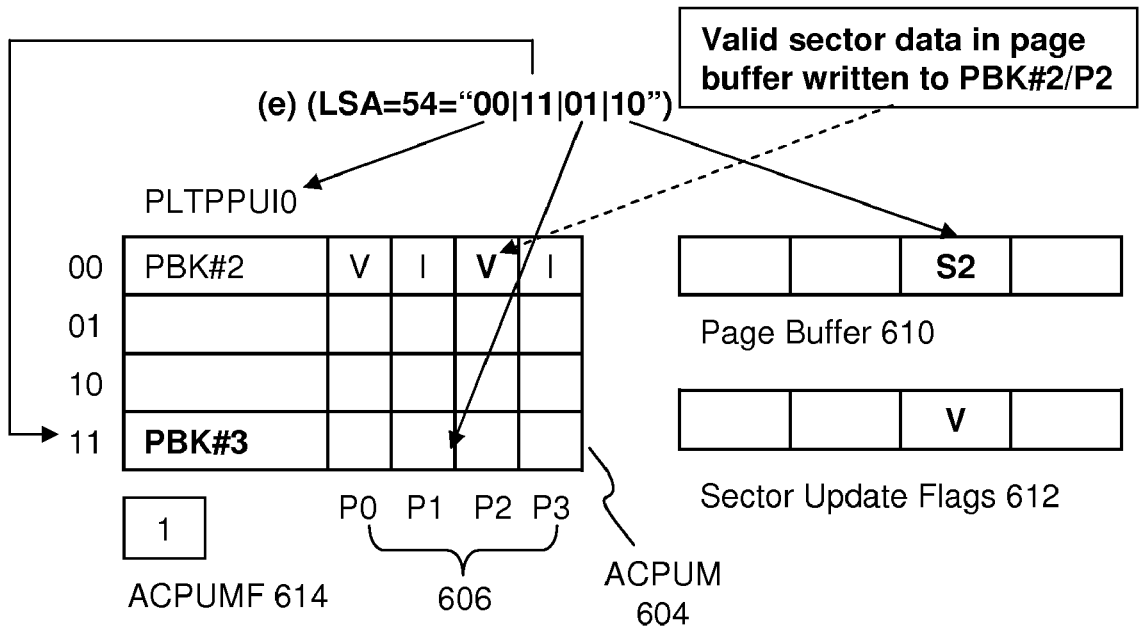

The next data write request (e) is to write to LSA=54 (FIG. 6C). The corresponding path is the process 500 is as follows:
 (1) receiving an LSA=54 and extracting set, entry, page and set numbers at 502;
 (2) determining whether ACPUM contains a current set of PLTPPUI at 504 (yes, PLTPPUI0);
 (3) reading physical block number (PBK#3) at entry 3 (i.e., binary '11 ') at 516;
 (4) determining data transfer request type at 518 (write);
 (5) determining whether page buffer contents have been modified at 532 (yes);
 (6) determining whether page and block number current at 534 (no, different block);
 (7) writing the page buffer contents to the corresponding page (third page of PBK#2) at 550, which includes determining a new block is required at 552; writing sector data to the third page of PBK#2 at 554 (no); updating at the corresponding page usage flag (P2) in ACPUM at 556 and resetting sector update flags at 558;
 (8) setting the ACPUMF (i.e., 1 for 'modified') at 536; and
 (9) writing received data sector (S2) into the page buffer and marking corresponding sector ($3^{rd}$) update flag at 538 before going back to "IDLE".

Figure 6D:
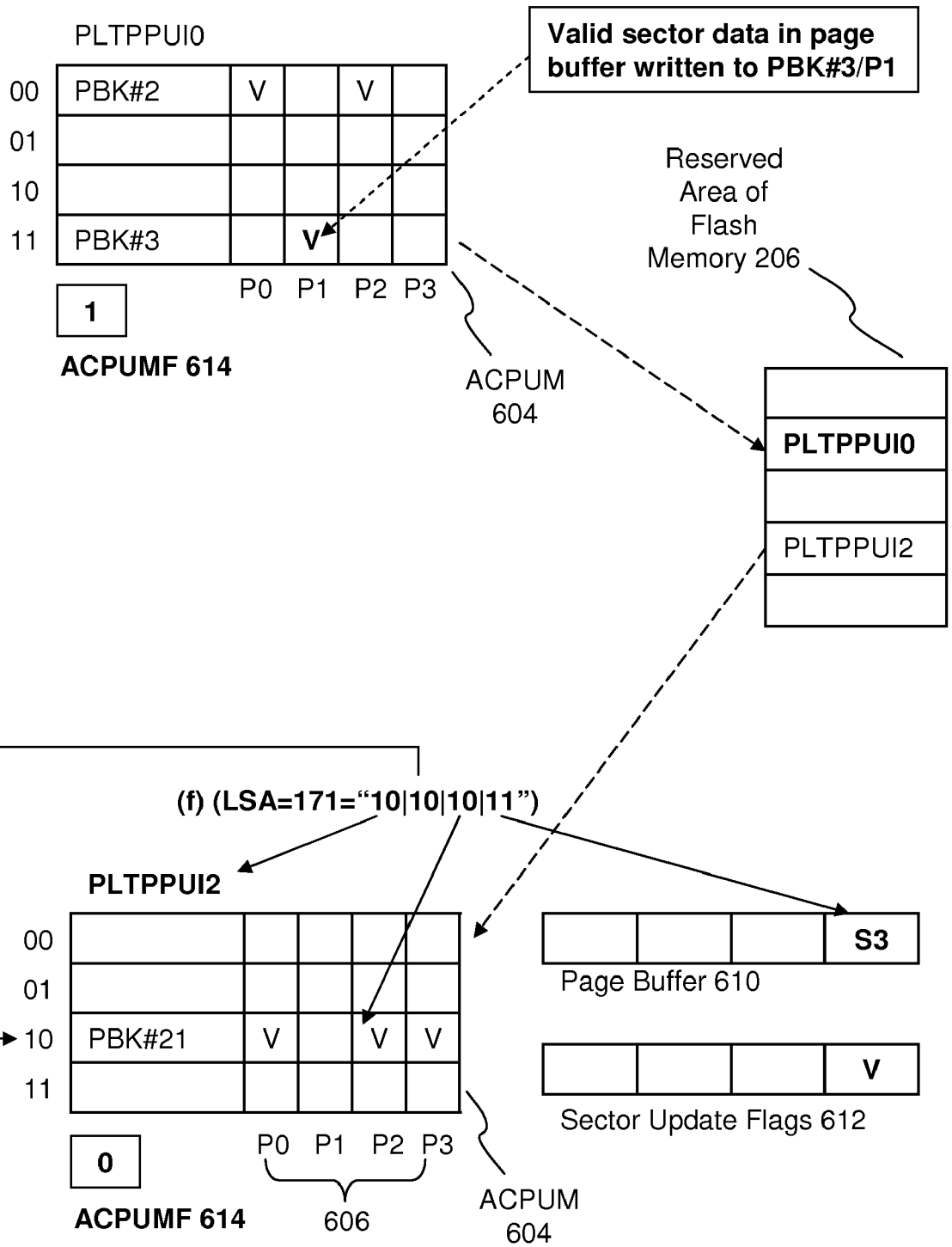

Finally, the next data write request (f) is to write to LSA=171 (FIG. 6D). The corresponding path is the process 500 is as follows:
 (1) receiving an LSA=171 and extracting set, entry, page and set numbers at 502;
 (2) determining whether ACPUM contains a current set of PLTPPUI at 504 (no, PLTPPUI0 does not match PLTPPUI2);
 (3) determining whether the page buffer contents need to be stored at 506 (yes);
 (4) writing the page buffer contents to the corresponding page (second page of PBK#3) at 550, which includes determining a new block is required at 552; writing sector data to the second page of PBK#3 at 554; updating at the corresponding page usage flag (P1) in ACPUM at 556 and resetting sector update flags at 558 and setting the ACPUMF (i.e., 1 for 'modified') at 508; (shown in upper half of FIG. 6D)
 (5) determining whether ACPUM has bee modified at 510 (yes);

(6) writing the ACPUM contents to corresponding physical block corresponding to the first special logical address for particular one of the N sets of PLTPPUI (PLTPPUI0), which includes locating the physical block from the PLTPPUI tracking table at 582; determining if the physical block is full at 584 (no); writing the ACPUM contents to a next page in the physical block at 586; updating the PLTPPUI tracking table with the next page number as the highest page number at 588; and resetting the ACPUMF at 590 (i.e., 0 for 'un-modified');

(7) loading a corresponding set of PLTPPUI (PLTPPUI2) from MLC to ACPUM at 514;

(8) reading physical block number (PBK#21) at entry 2 (i.e., binary '10') at 516;

(9) determining data transfer request type at 518 (write);

(10) determining whether page buffer contents have been modified at 532 (no);

(11) writing received data sector into the page buffer ad marks the corresponding one of the sector update flags at 538 before going back to the 'IDLE' state;

(12) determining whether the 'IDLE' time has exceeded a predefined period at 540 (yes); and

Figure 6E:
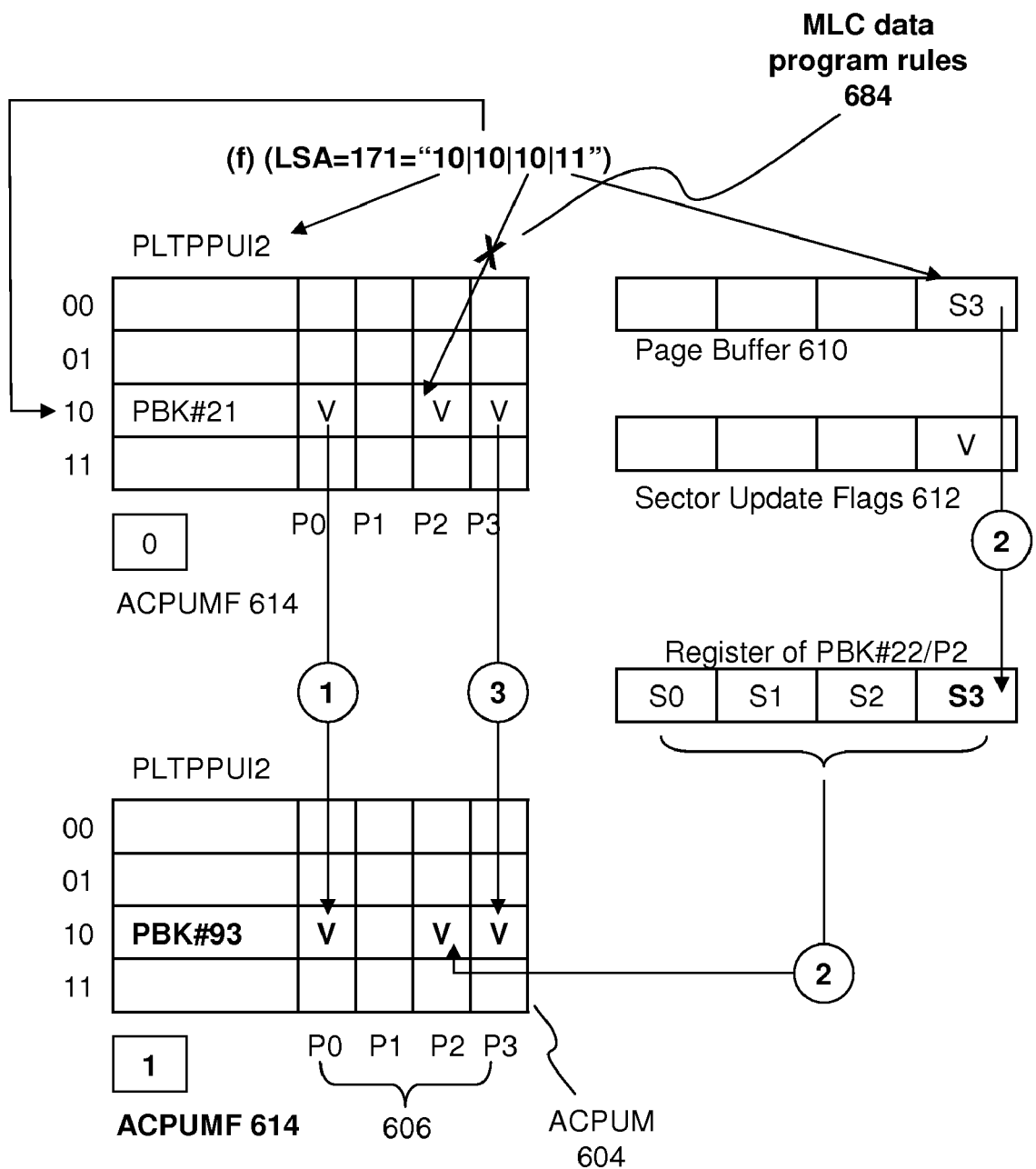

(13) performing background recycling of old blocks with stale data and writing the modified page buffer and ACPUM to MLC at 542 (more details in FIG. 6E).

FIG. 6E is a diagram showing a complicated data program or write involving a physical block containing data that prevents another data program operation directly in accordance with the MLC data programming rules. Using the sequence of data write requests shown in FIGS. 6A-6D, after the final data write request (f) has been completed. Both the page buffer 610 and ACPUM 604 have been modified, but yet to be stored in the flash memory. Due to data already existed in certain pages of the physical block (i.e. PBK#21), the MLC data program rules 684 prevent the modified page buffer 610 be written to PBK#21. A new blank block (i.e., PBK#93) is allocated and assigned to hold the data in the old block (PBK#21) including updates from the modified page buffer 610. The corresponding path in the step 550 of the process 500 is as follows:

(1) determining a new physical block is required according to the MLC rules at 552 (yes);

(2) allocating and assigning a new block based on the wear leveling rule at 554;

(3) updating the ACPUM 604 with the new block number (PBK#93) and same page usage flags at 564;

(4) if required, copying the valid pages with page number smaller than the current page number (i.e., P2 or $3^{rd}$ page derived from LSA) from the old block (PBK#21) to the new block PBK#93 at 566 (see STEP 1 in circle in FIG. 6E);

(5) writing sector data (S3) from the page buffer to the register of the corresponding page of PBK#93 and thus updating the page in PBK#93 at 568 (see STEP 2 in circle in FIG. 6E);

(6) if required, copying the valid pages with page number greater than the current page number (i.e., P2 or $3^{rd}$ page derived from LSA) from the old block (PBK#21) to the new block PBK#93 at 570 (see STEP 3 in circle in FIG. 6E); and (7) resetting the sector update flags at 558 before following the remaining data write steps of the process 500.

Referring now to FIGS. 7A-7E, which collectively are a flowchart illustrating an exemplary process 700 of initialization of a large capacity flash memory device in accordance with one embodiment of the present invention. The process 700 starts with a power up, for example, a flash memory device is plugged into a host 109. Next, the process 700 recreates the PLTPPUI tracking table 308 of FIG. 3 from stored N sets of PLTPPUI in the reserved area of the flash memory at 710. Then the process 700 validates the stored wear leveling and error correction code information with actual state of all of the physical blocks at steps 730 and 750, respectively. At 770, the process 700 verifies and validates the store PLTPPUI records against actual state of the physical blocks associated with a plurality of first special logical addresses. Finally, the process loads one of the N sets of PLTPPUI into ACPUM 306 at 790 before the initialization ends. The details of steps 710, 730, 750 and 770 are shown and described in respective FIGS. 7B, 7C, 7D and 7E.

Figure 7A:
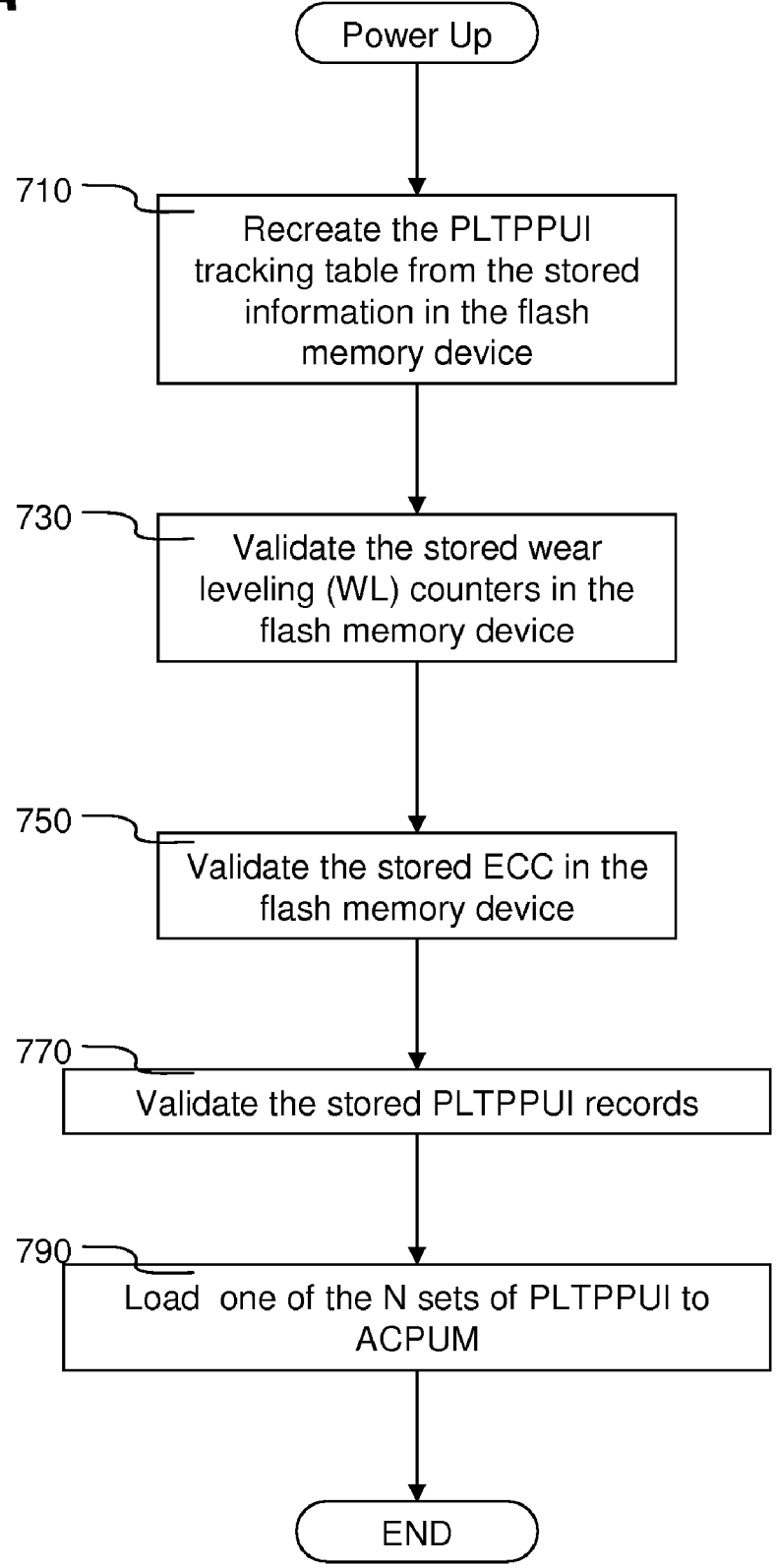
FIGS. 7A-7E collectively are a flowchart illustrating an exemplary process of initialization of a large capacity flash memory device in accordance with one embodiment of the present invention.
Figure 7B:
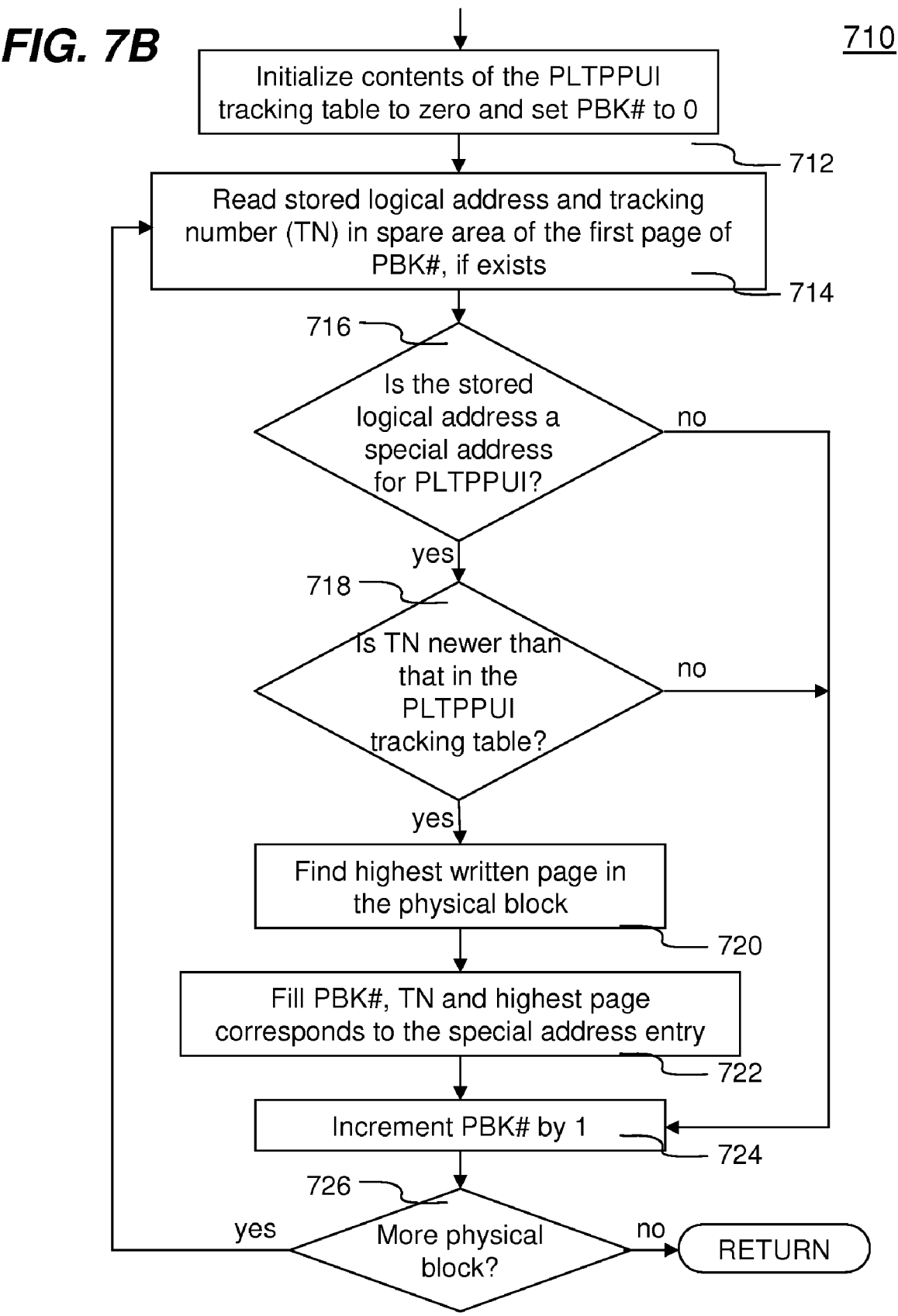

Shown in FIG. 7B, the process 700 initializes contents of the PLTPPUI tracking table 308 to zero and a physical block counter (PBK#) to 0 at 712. Next, the process 700 reads stored logical address and tracking number (TN) in the spare area of the first page of the physical block 'PBK#' at 714. Then the process 700 moves to decision 716, in which it is determined whether the stored logical address is one of the first special addresses for storing PLTPPUI issued by the FW and microcontroller. If 'no', the process 700 simply skips this physical block by incrementing the physical block counter 'PBK#' by one at 724. Next if additional physical block determined at decision 726, the process 700 moves back to step 714 for processing the next physical block, otherwise the step 710 is done.

If 'yes' at the decision 716, the process 700 follows the 'yes' branch to another decision 718. It is then determined whether the stored tracking number is newer than the one listed in the PLTPPUI tracking table 308. For example, the contents in the PLTPPUI tracking table is initialized to zero, any stored tracking number (TN) greater than zero indicates that the stored records are newer. If 'no' at decision 718, the process 700 skips this physical block similar to the 'no' branch of decision 716. However, if 'yes' at decision 718, the process 700 searches and locates a highest written page in this physical block 'PBK#' at 720. Next, at 722, the process 700 writes the 'PBK#', TN and highest page number in the PLTPPUI tracking table corresponding to the first special logical address. Finally, the process 700 increments the physical block count 'PBK#' by one at 724, then moves to decision 726 to determine either moving back to 714 for processing another physical block or ending the step 710.

Figure 7C:
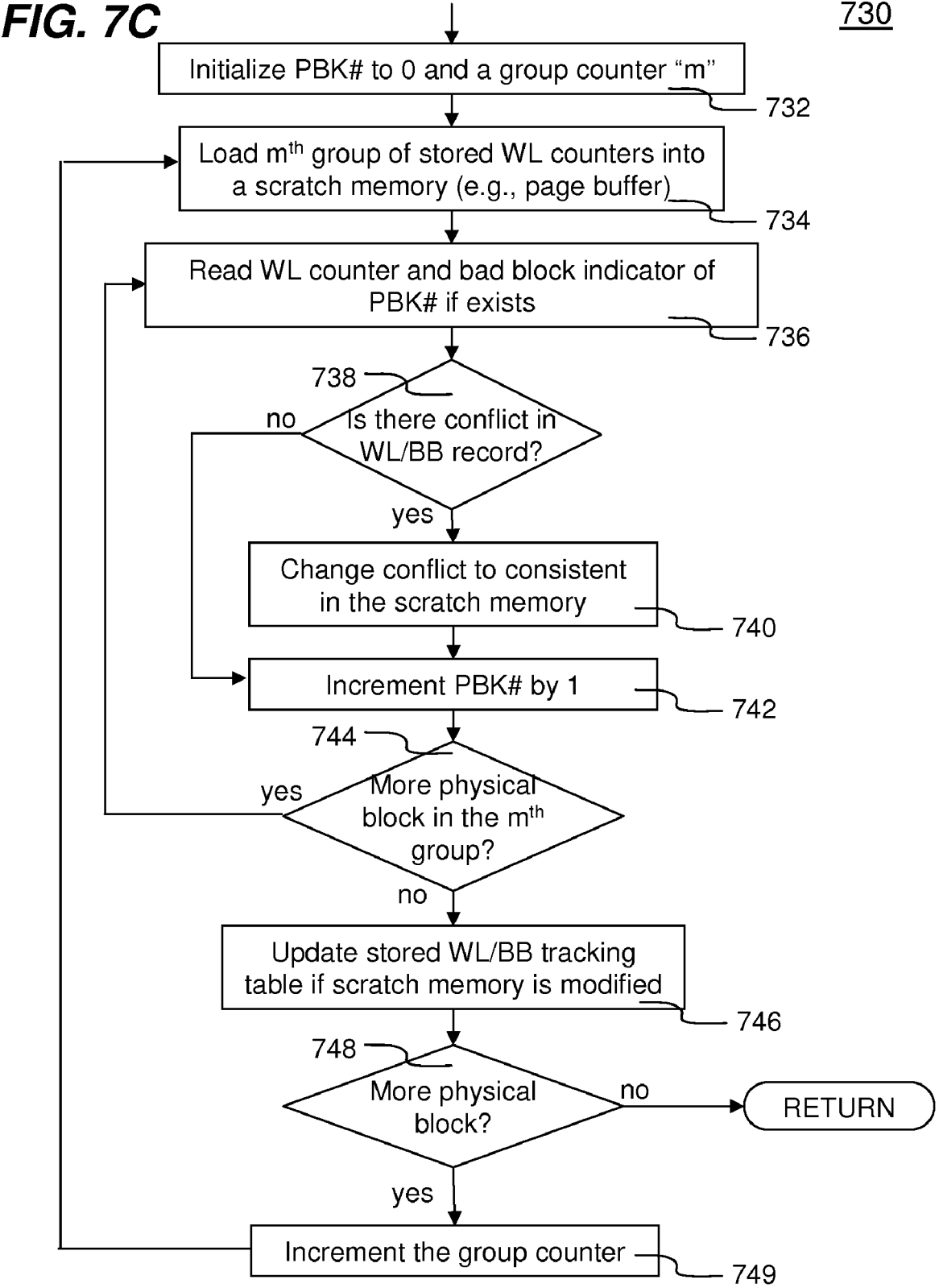

Details of step 730 are shown in FIG. 7C. At 732, the process 700 initializes a physical block counter 'PBK#' and a group counter 'm' to zero. Next, the process 700 loads an '$m^{th}$' group of stored WL/BB tracking table into a scratch memory space (e.g., the page buffer 314 of FIG. 3) at 734. Then the process 700 reads the wear leveling (WL) counter and bad block indicator for the physical block 'PBK#' at 736. The process 700 moves to decision 738, in which it is determined whether the stored information is in conflict with the physical state of 'PBK#'. If 'yes', the process 700 corrects the conflict information to be consistent with the physical state in the scratch memory at 740. If 'no' at decision 738, there is no need to correct the conflict.

Next, at 742, the physical block counter 'PBK#' is incremented by one. The process 700 moves to another decision 744, it is determined if there is additional block in the '$m^{th}$' group. If 'yes', the process 700 goes back to step 736 reading another WL counters of another physical block to repeat the above steps until the decision 744 becomes 'no'. The process 700 updates the stored WL/BB tracking table 310 at 746. At next decision 748, it is determined if there is any more physical block. If 'yes', the process 700 increments the group counter at 749 then goes back to 734 for repeating the above steps for another group. Otherwise, the step 730 returns when the decision 748 is 'no'.

Figure 7D:
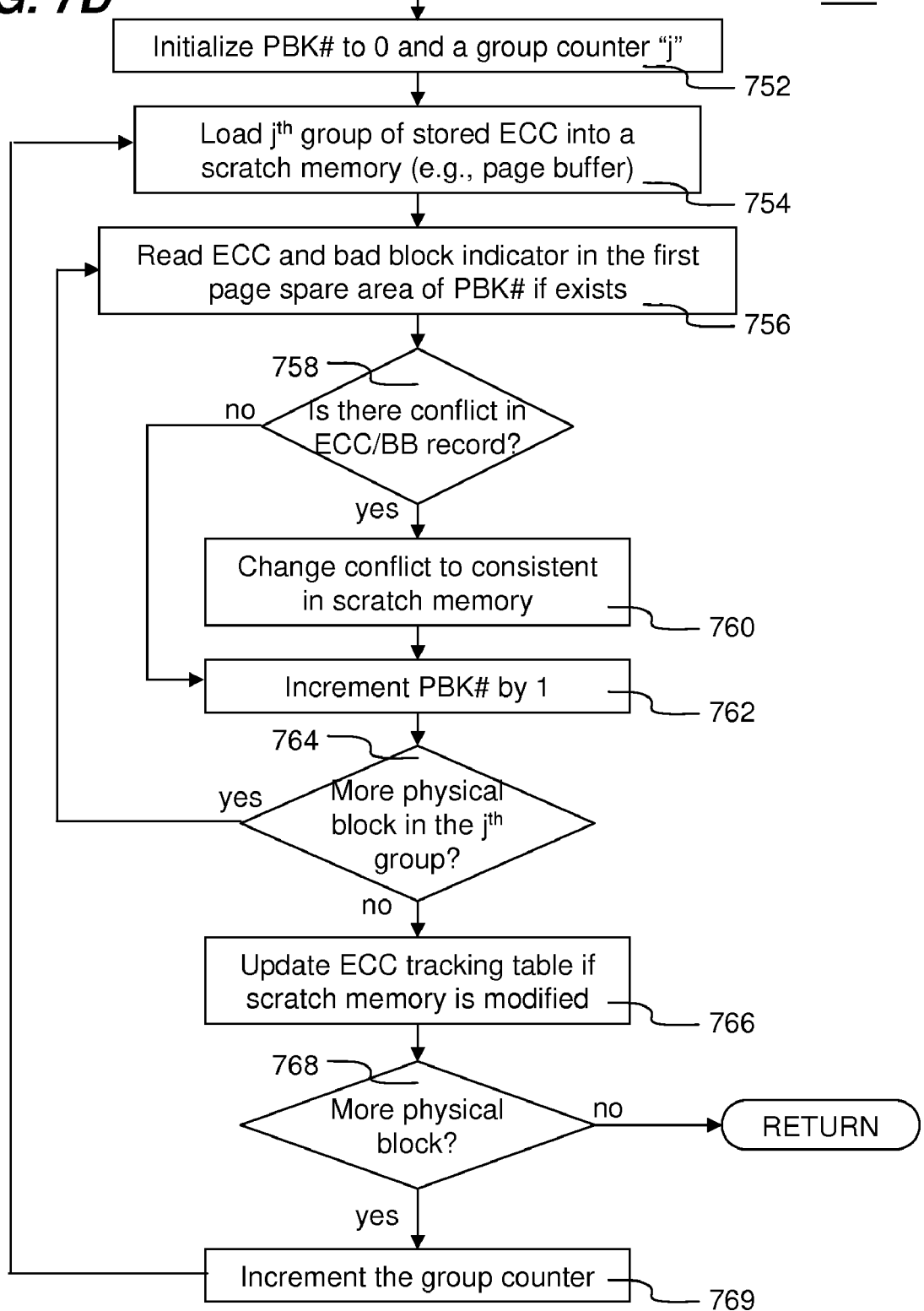

FIG. 7D shows details of step 750, which is substantially similar to the step 730. Instead of checking and correcting conflict WL/BB information, the step 750 validates and corrects the stored error correction code (ECC) for all physical blocks. The number of group is related to the size of the scratch memory. For example, a 2048-byte page buffer can provide space for holding a group of 1024 WL counters, if each of the WL counters is a 16-bit number. As to the 8-bit ECC, the same 2048-byte page buffer may hold a group of 2048 ECC codes.

Figure 7E:
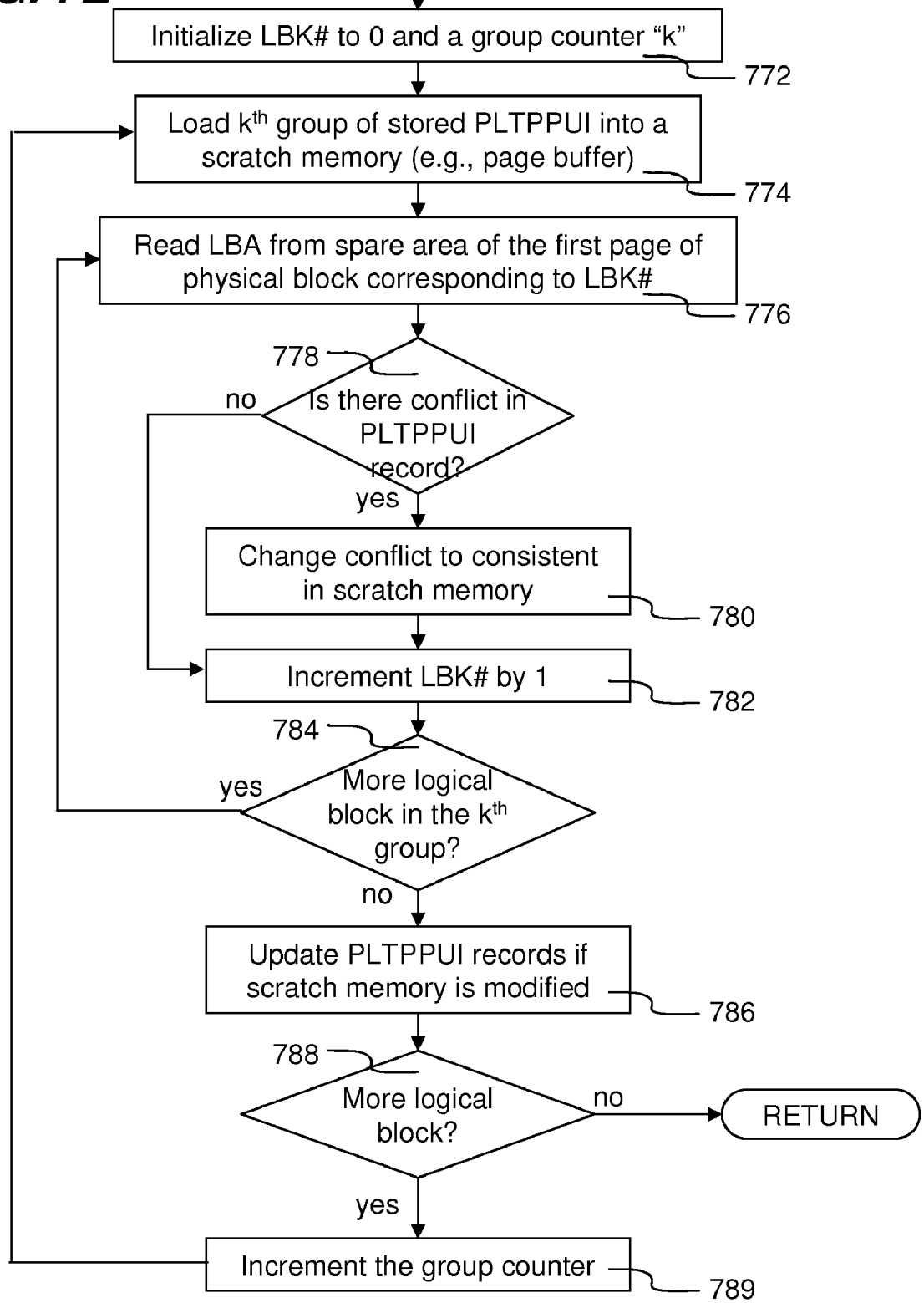

FIG. 7E shows details of step 770. At 772, the process 700 initializes a logical block counter 'LBK#' and a group counter 'k' to zero. The process 700 loads a 'k$^{th}$' group of stored PLTPPUI into a scratch memory space (e.g., a page buffer or other available memory) at 774. The process 700 reads logical block address from the spare area of the first page of a physical block corresponding to the 'LBK#' at 776. Next, at decision 778, it is determined whether there is conflict between the stored PLTPPUI and the physical page usage of the physical block. If 'yes', the conflict is corrected with the physical state in the scratch memory at 780. Otherwise, the process 700 skips step 780. Next, at 782, the process 700 increments the logical block counter 'LBK#' by one. The process 700 then moves to another decision 784, in which it is determined if there is more block in the 'k$^{th}$' group. If 'yes', the process 700 moves back the step 776 repeating the process until the decision 784 becomes 'no'. Then the process 700 updates the stored PLTPPUI records if the scratch memory has been altered at 786. Next, at decision 788, if there is more logical block, the process 700 follows the 'yes' branch to step 789 by incrementing the group counter and repeating the process from step 774 until the decision 788 becomes 'no', in which the step 770 ends.

Each entry record of PLTPPUI is 18-byte, which is a sum of 2-byte physical block number plus 128-bit (i.e., 16-byte) of page usage flags (i.e., 128 pages per block). Using 2048-byte page buffer as a scratch memory can only hold a group of 113 entry records. One may use a larger memory such as ACPUM 306 as the scratch memory, which may hold more entry records thereby reducing the initialization time.

Figure 8E:
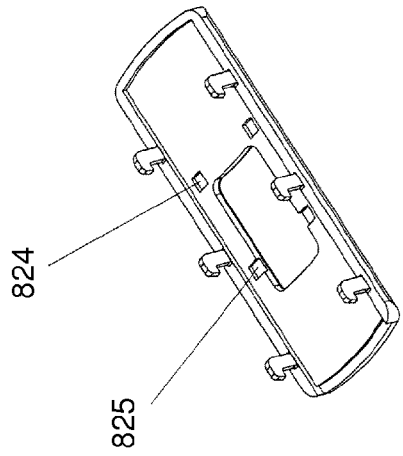
FIGS. 8A-8Q collectively shows various perspective views and exploded views of exemplary flash memory devices in accordance with several embodiments of the present invention.
Figure 8C:
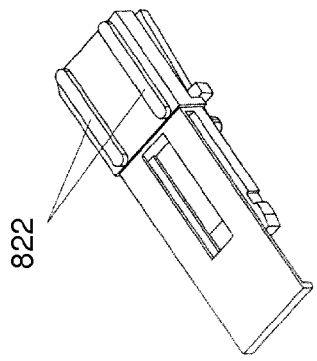
Figure 8D:
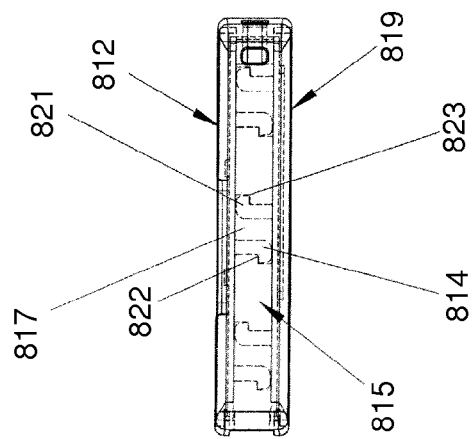
Figure 8G:
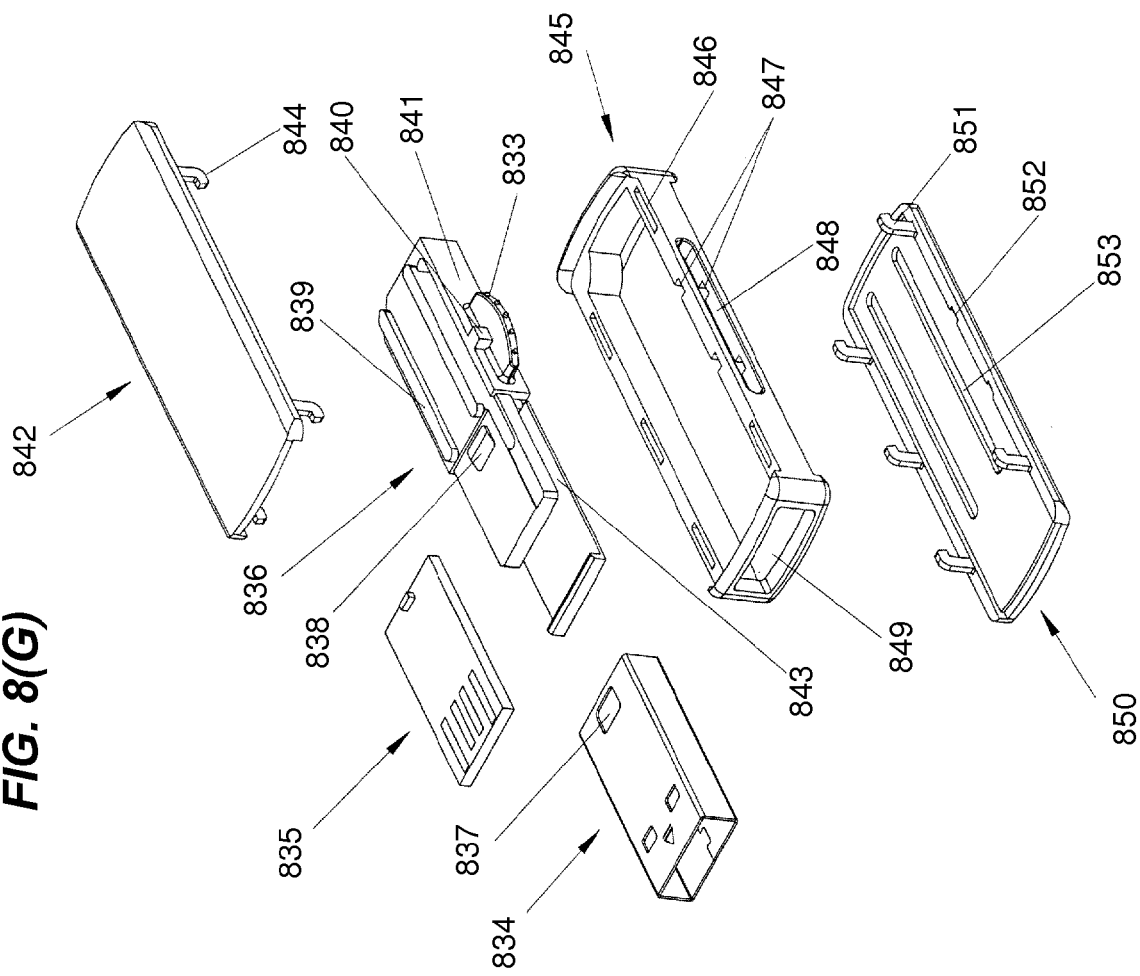
Figure 8F:
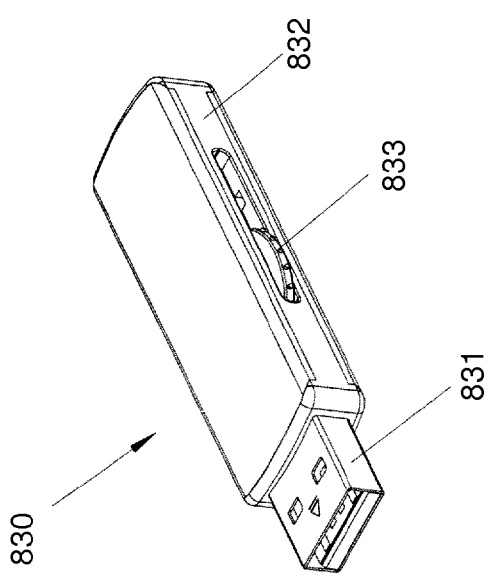
Figure 8I:
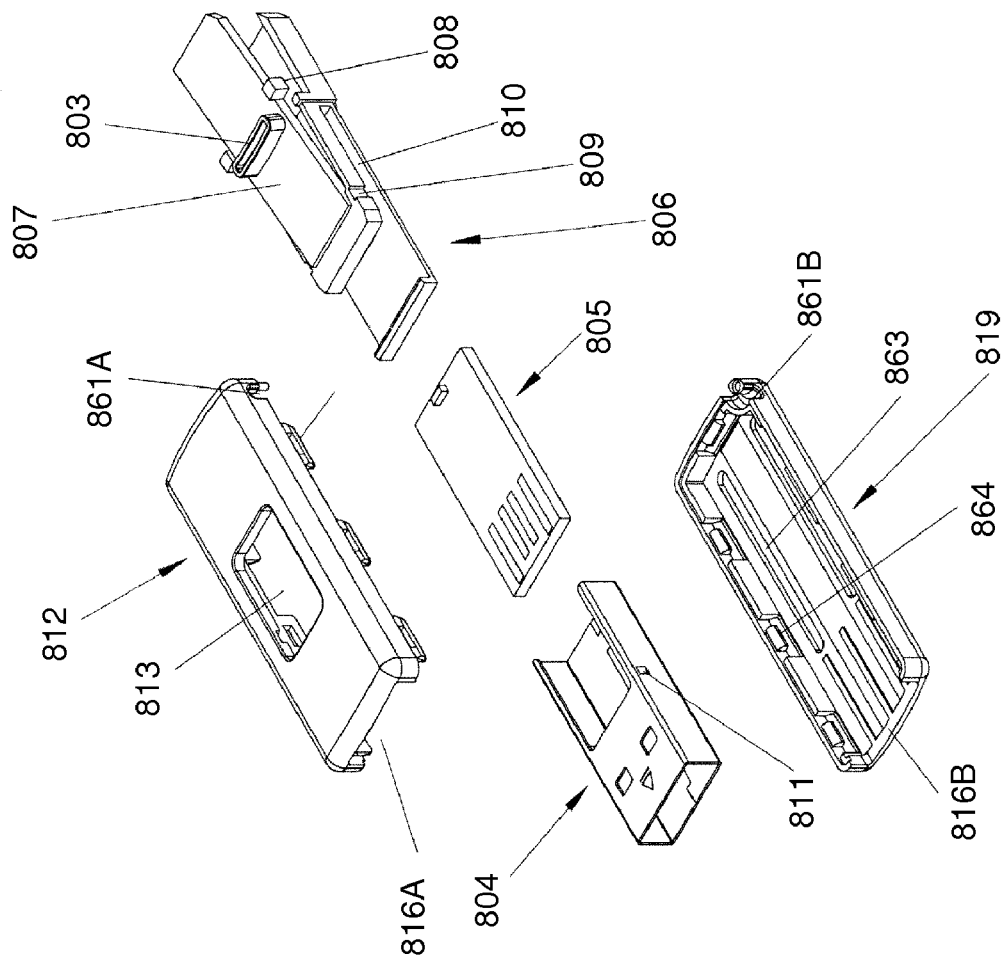
Figure 8H:
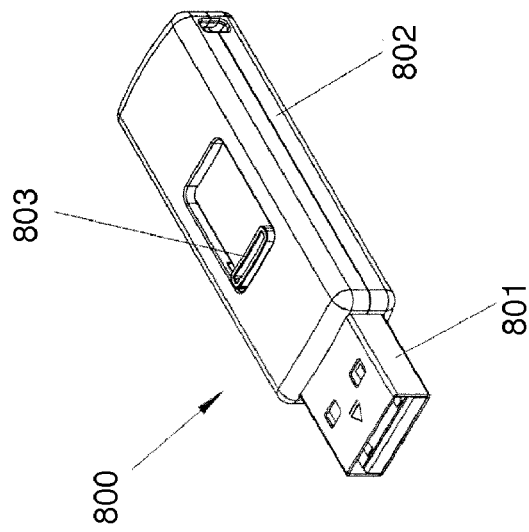
Figure 8K:
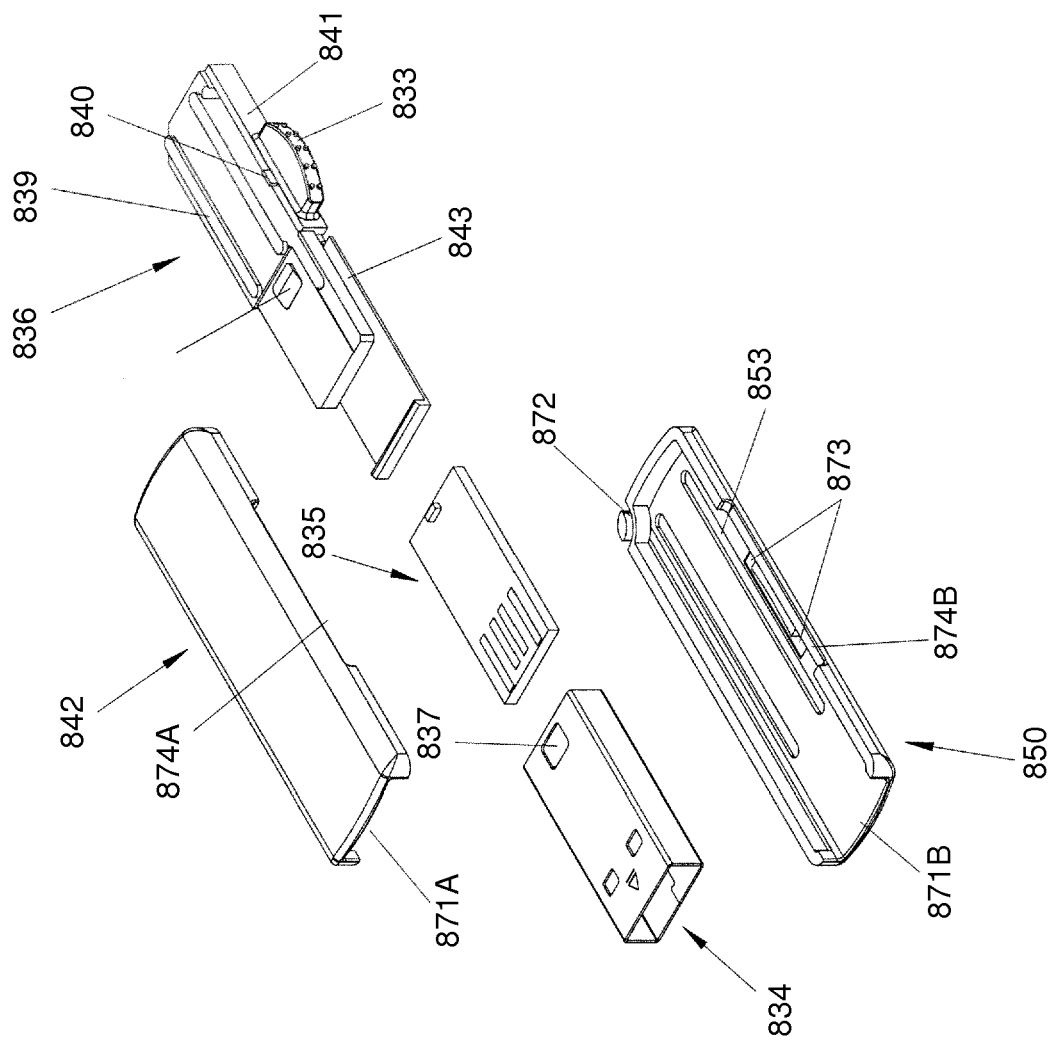
Figure 8J:
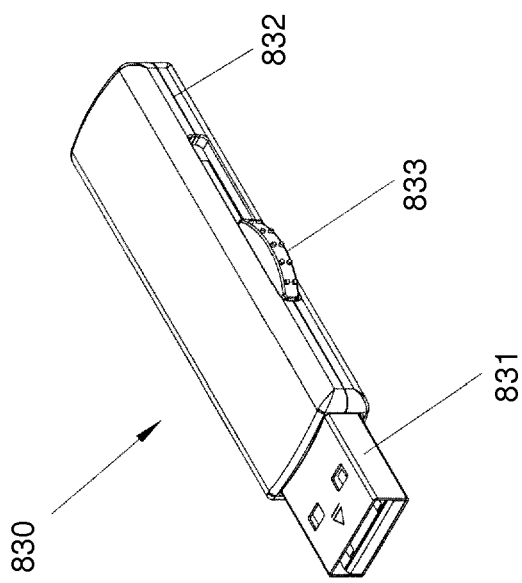
Figure 8M:
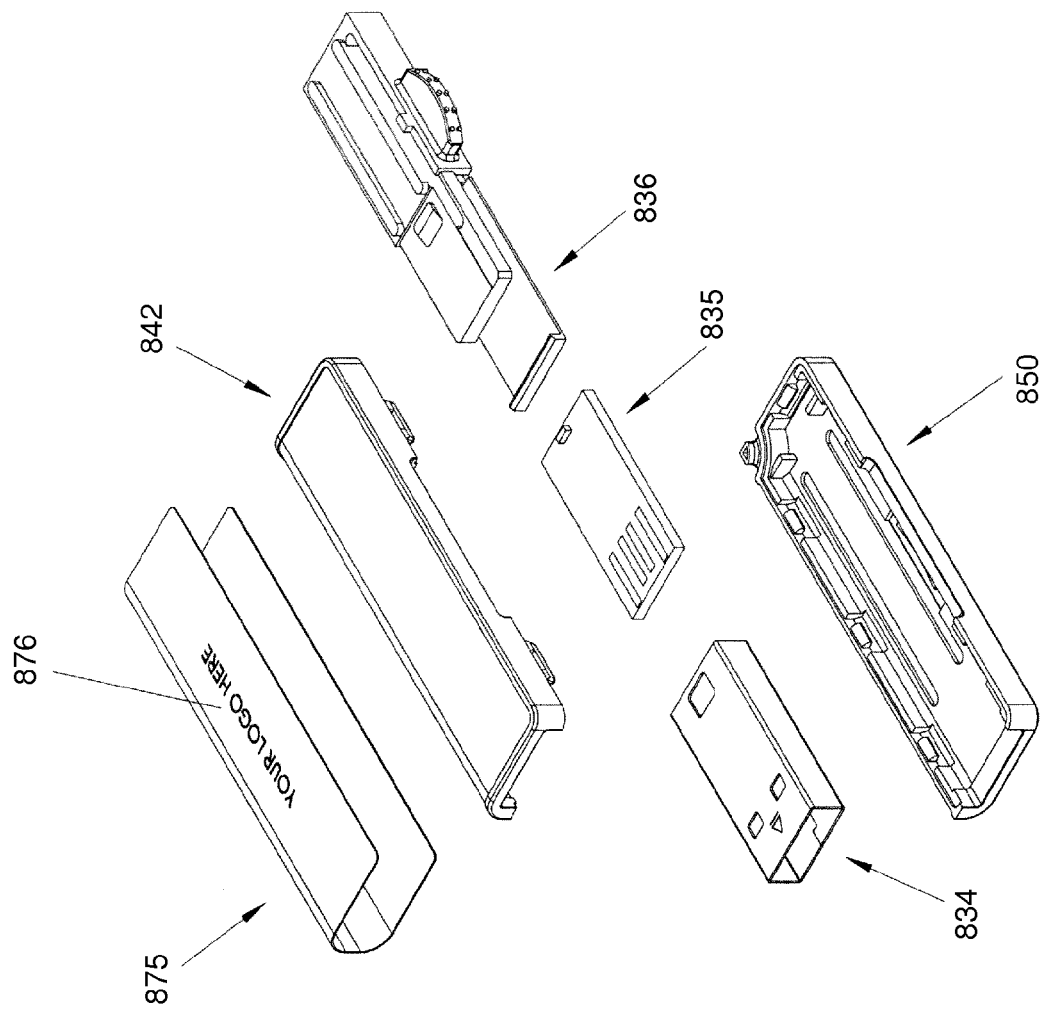
Figure 8L:
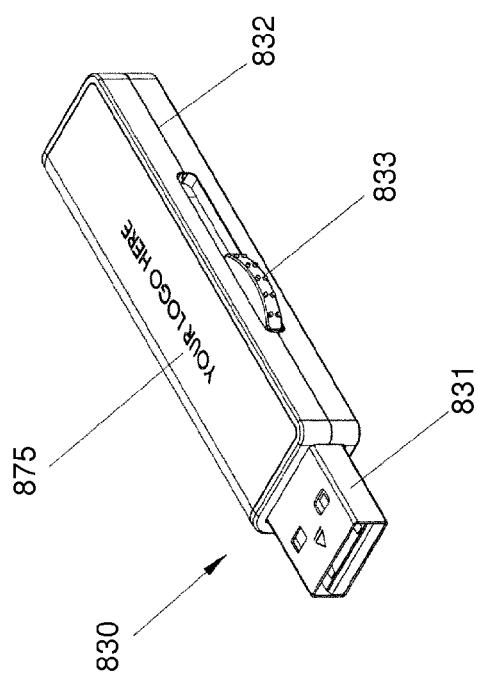
Figure 8Q:
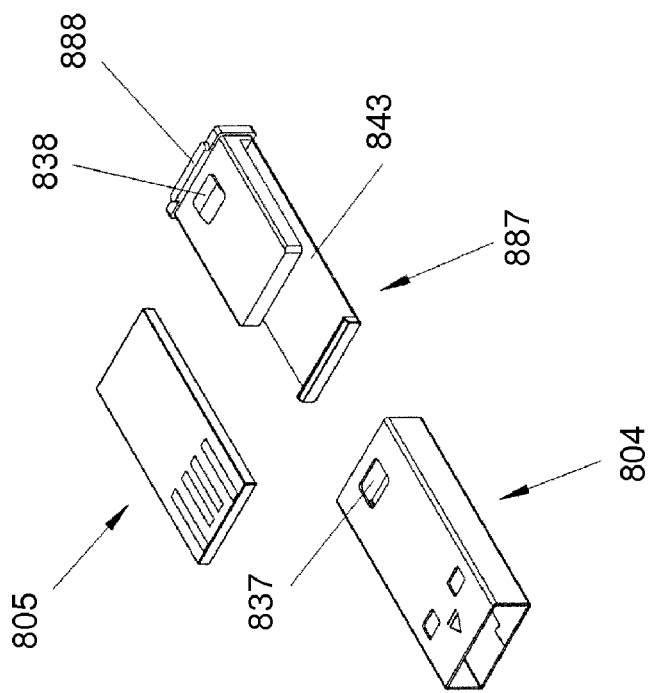

FIGS. 8A to 8Q collectively show various perspective views and exploded views of a MLC COB flash memory device including a core unit which is enclosed inside a housing structure in which a USB plug connector could be deployed out or retracted in by sliding a slide button either on the top or on the side of the housing structure, in accordance with several embodiments of the present invention.

FIG. 8A shows a perspective top view of a flash memory device is analogous to the flash memory device of FIG. 1B for larger capacity storage MLC-compatibility. In this embodiment the flash memory device is a slide MLC COB USB flash drive 800. The device 800 has a slide button 803 exposed on the top of the housing structure 802 to slide a USB plug connector 801 external to the housing structure 802.

FIG. 8B shows an exploded top view of the flash memory device 800 which is comprises of a core unit 826 and a housing structure 802. The core unit 826 is combined of three parts, a metal cover 804, a COB 805, and a COB carrier 806. The COB 805 is PCBA package including flash memory modules and processing unit and/or other electronic components in small PCB area with MLC compatible. The COB could be slid into a COB compartment 810 of the COB carrier 806. The COB compartment 810 is designed about the same length and width as the COB 805 so that the COB could be held snugly inside the compartment 810. Then the COB carrier 806 is inserted into the metal cover 804 until the inner tabs 811 of the metal cover 804 are snap coupled with the notches 809 of the COB carrier 806 in securing the COB 805 inside the metal cover 804. A USB plug connector 801 as shown in FIG. 8A is formed by the front portion of the metal cover 804, the front portion of the COB 805, and the front portion of the COB carrier 806 after the core unit 826 is assembled.

Still referring to FIG. 8B, a housing structure 802 is assembled first by snapping a frame 815 into a bottom cover 819. The core unit 826 assembled as described above is then laid inside the housing structure 802 with the USB plug connector 801 of the core unit 826 is protruded out of the connector opening 816 of the frame 815 and slide rails 822 underneath of the COB carrier 806 as shown in the perspective bottom view in FIG. 8C is laid on the slide tracks 820 of the bottom cover 819. The purposes of this design feature are to ensure the linear motion of the core unit 826 inside the housing structure 802 and also to secure the core unit 826 inside the housing structure 802. The housing structure 802 is then closed by snapping a top cover 812 into the frame 815. FIG. 8D shows the side view of the housing structure 802 without the core unit 826 inside to demonstrate the snap-coupling mechanism between the frame 815, the top and bottom covers 812 and 819. The frame 815 with special design slots 817 with upper and lower steps 822-823 and optional key chain opening 818. The top hooks 814 of the top cover 812 are snap coupled with the lower steps 822 inside the slots 817 of the frame and the bottom hooks 821 of the bottom cover 819 are snap coupled with the upper steps 823 inside the slots 817 of the frame.

Referring to FIGS. 8A and 8B again, as the core unit 826 secured and completely trapped inside the housing structure 802, the USB plug connector 801 at the front portion of the core unit 826 could be deployed external to the housing 802 through the connector opening 816 of the housing structure 802 by sliding a slide button 803 on the flexible section 807 of the COB carrier 806. The slide button 803 is exposed through the top opening 813 of the top cover 812. The lock positions at deploying and retracting the USB plug connector 801 could be obtained whenever the lock tabs 808 on the flexible section 807 of the COB carrier 806 are snapped into the deployed or retracted lock grooves 825-824 of the top cover 812 as shown in the perspective bottom view in FIG. 8E.

The concept of applying the elasticity of plastic or similar materials on the flexible section 807 where a slide button 803 and lock tabs 808 are disposed on and the method for deploying and retracting the USB plug connector 801 out of and into the housing 802 plus the locking mechanism between the locking tabs (core unit) and locking grooves (housing structure) are described in details in co-pending of U.S. patent application for "Press/Push USB Flash Drive with Deploying and Retracting Functionalities with Elasticity Material and Fingerprint Verification Capability", Ser. No. 11/845,747, filed Aug. 27, 2007, and U.S. patent application for "A Press/Push Flash drive", Ser. No. 11/933,226, filed Oct. 31, 2007, and U.S. patent application for "Multi-Level-Cell (MLC) Slide Flash Memory Device, Ser. No. 12/050,748, filed Mar. 18, 2008 even though the design structures in those applications are totally different.

FIG. 8F shows a perspective top view of a similar flash memory device 830 as shown in FIG. 8A except the slide button 833 in this embodiment is exposed from the side of the housing structure 832 to slide the USB plug connector 831 external to the housing structure 832.

FIG. 8G continues to describe this flash memory device in an exploded top view. The device carries the same components and features as the device in FIG. 8B; however, because now the slide button 833 is on the side of the COB carrier 836, therefore, the flexible section 841, the lock tabs 840 are also moved to the side of the COB carrier 836. The result of these moving locations of the slide button 833, lock tabs 840, and flexible section 841 create a space for additional slide rails 839 on the top surface of the COB carrier 836. Other impact is the top opening of the top cover is no longer there because the slide button 833 is moved to the side of the housing structure 832. The top cover 842 now has slide tracks (not shown) matching with top slide rails 839 of the COB carrier 836. The additional slide rails 839 from the top surface of the COB carrier 836 have the core unit more secured inside the housing structure 832 and moved linearly along the body of the housing structure 832. The top cover 842 now has lock grooves (not shown) for deployed and retracted positions on the same side with the top lock tab 840 of the COB carrier 836. The frame 845 is also impacted by this change of location, the frame 845 now has a side opening 848 for the slide button 833 exposed external to the housing structure 832. The frame 845 also has lock grooves 847 for deployed and retracted positions on the same side with the top and bottom lock tabs 840 of the COB carrier 836. The bottom cover 850 is minor image of the top cover 842 with hooks 851, slide tracks 853, and lock grooves 852.

Also referring to 8G, the core unit is assembled the same way as described as in FIG. 8B with minor adjustments as now the slide button 833 is on the side of the housing structure 832. The COB 835 is inserted into the COB compartment 843 of the COB carrier 836 which in turn is inserted into the metal cover 834 until the tab 838 of the COB carrier 836 is snap coupled with the slot 837 of the metal cover 834. The housing structure 832 is assembled by snapping the frame 845 into the bottom cover 850 first, next the core unit is laid inside housing structure 832 in which the USB plug connector 831 exposed from the front and the slide button 833 is exposed from the side of the housing structure 832. Then the housing structure 832 is closed by snapping the top cover 842 into the frame 845. Same mechanical concept work for this device with the USB plug connector 831 is being deployed or retracted by sliding the slide button 833 into the lock positions with the lock tabs 840 of the core unit are being snapped into the lock grooves 847 of the housing structure 832.

FIG. 8H shows a perspective top view of a flash memory device is similar to the flash memory device in FIG. 8A. In this alternative embodiment, the slide MLC COB USB flash drive 800 also has a slide button 803 exposed on the top of the housing structure to slide a USB plug connector 801 external to the housing structure 802. The internal structure of this device shown in an exploded top view in FIG. 8I also has a core unit with metal cover 804, COB 805, and COB carrier 806. The difference now is the housing structure 802 only has the top and the bottom covers 812 and 819 without the middle frame. The top cover 812 is snapping coupled with the bottom cover 819 to enclose the core unit inside by snap-together or ultrasonic methods. The basic feature of the parts such as the metal cover 804, the COB carrier 806, the top and bottom cover 812 and 819 are basically the same as described in FIGS. 8B, 8C, and 8E with optional key chain opening 861A-861B on the top and bottom covers 812 and 819.

FIG. 8J shows a perspective top view of a similar flash memory device as shown in FIG. 8H except the slide button 833 in this embodiment is exposed from the side of the housing structure 832 to slide the USB plug connector 831 external to the housing structure 832.

FIG. 8K continues to describe this flash memory device in an exploded top view. The device carries the same components and features as the device in FIG. 8I; however, because now the slide button 833 is on the side of the COB carrier 836, therefore, the flexible section 841, the lock tabs 840 are also moved to the side of the COB carrier 836. The result of these moving locations of the slide button 833, lock tabs 840, and flexible section 841 create a space for additional slide rails 839 on the top surface of the COB carrier 836, along with the slide rails (not shown) at the bottom surface of the COB carrier 836. Other impact is the top opening of the top cover 842 is no longer there because the slide button 833 is on the side of the housing structure 832. Therefore there is a side opening 874A on the side of the top cover 842 instead. The top cover 842 now has the slide tracks (not shown) matching with the slide rails of the COB carrier 836. The additional slide rails 839 from the top surface of the COB carrier 836 have the core unit more secured inside the housing structure 832 and moved linearly along the body of the housing structure 832. The top cover 842 now has lock grooves (not shown) for deployed and retracted positions on the same side with the top lock tab of the COB carrier 836 and optional key chain opening (not shown). The bottom cover 850 is minor image of the top cover 842 with slide tracks 853, lock grooves 873, side opening 874B, and optional key chain opening 872. The top cover 842 is snapping coupled with the bottom cover 850 to enclose the core unit inside by snap-together or ultrasonic methods.

FIG. 8L is another alternative embodiment with the same structure as the device in FIG. 8J with a slide button on the side of the housing structure to deploy the USB plug connector external to the housing structure. The enhanced part is added here is a shell 875 made out of thin sheet metal.

FIG. 8M continues to describe this flash memory device in an exploded top view. The device carries the same components and features as the device in FIG. 8K with the addition of the shell 875 including the top and bottom cover 842 and 850, the metal cover 834, the COB 835, and the COB carrier 836. The shell 875 is made out of thin sheet metal such as aluminum, etc. with a rectangular U shape could be slid into the housing structure from the opposite side of the slide button. The shell could cover 3 surfaces of the housing structure, the top, the bottom, and the side opposite to the slide button. The purpose of this shell are first to protect the housing structure normally made out of soft material such as plastic from scratching, second the outer surfaces of the shell covered with silkscreen with artwork 876 are used to show to the company logo, customer logo, sport or other artwork designs to enhance the appearance of the device. These outer surfaces of the shell could be used to indicate the specifications of the device as well.

FIG. 8N is an alternative embodiment with the similar structure as the device in FIG. 8A with a slide button 803 on the top of the housing structure 802 to deploy the USB plug connector 801 external to the housing structure 802. The difference here is the structure of the core unit inside the housing structure.

Figure 8P:
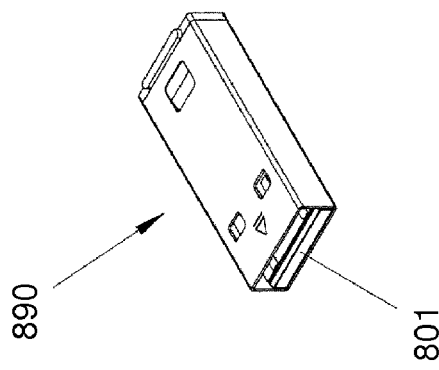

FIG. 8O continues to describe this flash memory device in an exploded top view. The device is also combined of a housing structure and a core unit. The housing structure 802 with three parts, the bottom cover 819, frame 815, and the top cover 812 are pretty much the same as described in FIGS. 8B, 8D, and 8E. The core unit however is quite different. It consists of a COB core putting together first with three parts, a metal cover 804, a COB 805, and an end cap 887 as shown in FIGS. 8P and 8Q. The COB 805 is put into the COB compartment 843 of the end cap 887 which in turn is inserted into the metal cover 804 until the tabs 838 of the end cap, one top of the end cap 887 and additional tabs (not shown) under the end cap 887 are snapped couple with the slots 837 of the metal cover 804 accordingly by designed to secure the COB 805 and the end cap 887 inside the metal cover 804. A USB plug connector 801 is formed by the front portion of the metal cover 804, the front portion of the COB 805, and the front portion of the end cap 887 after the COB core is assembled. This COB core is then enclosed inside a top COB carrier 881 and a bottom COB carrier 882 with the USB plug connector 801 is protruded through the connector openings 884A-884B of the top and bottom COB carriers 881-882. The top COB carrier 881 is snap coupled with the bottom COB carrier 882 to enclose the COB core inside by snap-together or ultrasonic methods. The end cap 887 of the COB core has a top and bottom lock bars 888 which are snap coupled with the lock slots 886 of the top and bottom COB carriers 881-882 in order to secure the COB core inside the top and bottom COB carriers 881-882. This core unit with the COB core and the top and bottom COB carriers 881-882 together is then assembled inside the housing structure 802 as described in FIG. 8B.

FIGS. 8P and 8Q show the COB core 890 in a perspective top view and an exploded top view respectively for clarification. This COB core 890 is also called COB 1 chip or single chip USB device which is an intelligent Non-Volatile Memory (NVM) device can be implemented as a single chip, which may include, but not limited to, a product-in-package, a device-on-device package, a device-on-silicon package, or a multi-die package. This COB core 890 in FIG. 8P could be used as an independent USB device in connecting with a host with USB receptacle slot without any of the COB carriers and the housing structure as described in FIG. 8O.

Some portions of the preceding detailed descriptions have been presented in term of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas the size of the data area of a page has been shown to hold four sectors of 512-data, a page holds other number of sectors such as eight may be used. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A portable flash memory device, comprising:
   a housing having a top cover and a bottom cover, wherein the top cover includes a top opening disposed thereon; and
   a core unit having a universal serial bus (USB) plug connector coupled to one or more multi-level cell (MLC) flash memory devices and an MLC flash controller disposed therein, the MLC flash controller controlling the one or more MLC flash memory devices and the USB plug connector providing an interface for accessing the one or more MLC flash memory devices, wherein the core unit includes
      a chip-on-bard (COB) package having the MLC flash memory devices and MLC flash controller embedded therein,
      a COB carrier having a COB compartment for storing the COB package therein, wherein the COB carrier includes a top surface having a slide button disposed thereon, and
      a metal cover to allow a frontend of the COB carrier having USB compatible electrical contact pins disposed therein, wherein the frontend of the COB carrier slides into the metal cover to form the USB plug connector,
   wherein the housing is configured to enclose, using the top cover and the bottom cover, the core unit by exposing the slide button through the top opening of the housing, wherein the slide button, when being pushed sliding forward within the top opening of the housing, causes the USB plug connector of the core unit to be deployed external to the housing through a front opening of the housing, and wherein the slide button, when being pushed sliding backward within the top opening of the housing, causes the USB plug connector of the core unit to be retracted into the housing through the front opening of the housing.

2. The portable flash memory device of claim 1, wherein the COB carrier further comprises a flexible section made of elastic material to form a top surface of the COB carrier having the slide button disposed thereon, wherein when the COB carrier slides into the housing, the flexible section pushes the slide button upwardly through the top opening of the housing to allow the slide button to be pushed sliding back and forth.

3. The portable flash memory device of claim 2, wherein the top cover of the housing further comprises deploy lock grooves and retract lock grooves disposed on an inner wall of the top cover, wherein the flexible section of the COB carrier comprises lock tabs, wherein when the USB plug connector is deployed by sliding the core unit forwardly, the lock tabs of the flexible section are engaged with the deploy lock grooves of the top cover to lock the core unit in a deployed position, and wherein when the USB plug connector is retracted by sliding the core unit backwardly, the lock tabs of the flexible section are engaged with the retract lock grooves of the top cover to lock the core unit in a retracted position.

4. The portable flash memory device of claim 3, wherein the COB carrier further comprises slide rails disposed on a bottom surface of the COB carrier, wherein the bottom cover of the housing further comprises slide tracks disposed on an inner wall of the bottom cover corresponding to the slide rails of the COB carrier to allow the COB carrier to slide within the housing in a smooth manner.

5. The portable flash memory device of claim 4, wherein the top cover further comprises a front cutout, one or more tabs, and an optional key chain cutout, wherein the bottom cover further comprises a front cutout, one or more tabs, and an optional key chain cutout, and wherein the top and bottom covers are snapped together through the corresponding one or more tabs, wherein the front cutouts of the top and bottom covers form the frontend opening of the housing and the optional key chain cutouts of the top and bottom covers form an optional key chain hook.

6. The portable flash memory device of claim 4, wherein the housing further comprises a frame sandwiched by the top cover and the bottom cover to enclose the core unit, wherein the frame includes a frontend and a backend, the frontend including the frontend opening to deploy and retract the USB plug connector therethrough, wherein the frame further includes an optional keychain hook disposed near a corner of the backend to allow the portable flash memory device to be hooked with a key chain.

7. The portable flash memory device of claim 6, wherein the top cover and the bottom cover of the housing further comprise one or more hooks respectively disposed on inner walls of the top and bottom covers which can be snapped to engage with corresponding slots disposed on side walls of the frame to form the enclosed housing.

8. The portable flash memory device of claim 7, wherein the flexible section of the COB carrier further comprises a lock tab, one for each side, wherein when the COB carrier slides into the metal cover, the lock tabs are snapped into corresponding inner tabs of the metal cover to secure the COB carrier therein.

9. A portable flash memory device, comprising:
a housing having a top cover, a bottom cover, and a frame sandwiched between the top cover and the bottom cover, wherein the frame includes a side opening and a front opening; and
a core unit having a universal serial bus (USB) plug connector coupled to one or more multi-level cell (MLC) flash memory devices and an MLC flash controller disposed therein, the MLC flash controller controlling the one or more MLC flash memory devices and the USB plug connector providing an interface for accessing the one or more MLC flash memory devices, wherein the core unit includes
a chip-on-bard (COB) package having the MLC flash memory devices and MLC flash controller embedded therein,
a COB carrier having a COB compartment for storing the COB package therein, wherein the COB carrier includes a side surface having a slide button disposed thereon, and
a metal cover to allow a frontend of the COB carrier having USB compatible electrical contact pins disposed therein, wherein the frontend of the COB carrier slides into the metal cover to form the USB plug connector,
wherein the housing is configured to enclose, using the top cover and the bottom cover, sandwiching the frame having the core unit deposited therein by exposing the slide button through the side opening of the frame, wherein the slide button, when being pushed sliding forward within the side opening of the frame, causes the USB plug connector of the core unit to be deployed external to the housing through a front opening of the frame, and wherein the slide button, when being pushed sliding backward within the side opening of the frame, causes the USB plug connector of the core unit to be retracted into the housing through the front opening of the frame.

10. The portable flash memory device of claim 9, wherein the COB carrier further comprises a flexible section made of elastic material to form a side surface of the COB carrier having the slide button disposed thereon, wherein when the COB carrier slides into the housing, the flexible section pushes the slide button outwardly through the side opening of the frame to allow the slide button to be pushed sliding back and forth.

11. The portable flash memory device of claim 10, wherein the top and bottom cover of the housing further comprises a deploy lock groove and a retract lock groove disposed on an inner wall of the top and bottom cover, wherein the flexible section of the COB carrier comprises lock tabs, wherein when the USB plug connector is deployed by sliding the core unit forwardly, the lock tabs of the flexible section are engaged with the deploy lock groove of the top and bottom cover to lock the core unit in a deployed position, and wherein when the USB plug connector is retracted by sliding the core unit backwardly, the lock tabs of the flexible section are engaged with the retract lock groove of the top and bottom cover to lock the core unit in a retracted position.

12. The portable flash memory device of claim 11, wherein the COB carrier further comprises slide rails respectively disposed on a top surface and a bottom surface of the COB carrier, wherein the top cover and the bottom cover of the housing further comprise slide tracks respectively disposed on an inner wall of the top and bottom covers corresponding to the slide rails of the COB carrier to allow the COB carrier to slide within the housing in a smooth manner.

13. The portable flash memory device of claim 12, wherein the top cover and the bottom cover of the housing further comprise one or more hooks respectively disposed on inner walls of the top and bottom covers which can be snapped to engage with corresponding slots disposed on side walls of the frame to form the enclosed housing.

14. The portable flash memory device of claim 13, wherein the flexible section of the COB carrier further comprises a lock tab disposed on the top surface of the COB carrier, wherein when the COB carrier slides into the metal cover, the lock tab of the top surface is snapped into a corresponding inner tab of the metal cover to secure the COB carrier therein.

15. The portable flash memory device of claim 12, wherein the top cover further comprises a front cutout, a side cutout, and an optional key chain cutout, wherein the bottom cover further comprises a front cutout, a side cutout, and an optional key chain cutout, and wherein the top and bottom covers are attached together through a snap-together or an ultrasonic method, wherein the front cutouts of the top and bottom covers form the frontend opening of the housing, wherein the side cutouts of the top and bottom covers form the side opening, and wherein the optional key chain cutouts of the top and bottom covers form an optional key chain hook.

16. The portable flash memory device of claim 15, further comprising a U-shape shell covering the housing without covering the side opening, wherein a silkscreen artwork can be printed on the U-shape shell.

17. A portable flash memory device, comprising:
   a housing having a top cover, a bottom cover, and a frame sandwiched between the top cover and the bottom cover, wherein the top cover includes a top opening and the frame includes a side opening; and
   a core unit having a universal serial bus (USB) plug connector coupled to one or more multi-level cell (MLC) flash memory devices and an MLC flash controller disposed therein, the MLC flash controller controlling the one or more MLC flash memory devices and the USB plug connector providing an interface for accessing the one or more MLC flash memory devices, wherein the core unit includes
      a chip-on-bard (COB) package having the MLC flash memory devices and MLC flash controller embedded therein,
      an end cap having a COB compartment for storing the COB package therein,
      a metal cover to allow a frontend of the end cap having USB compatible electrical contact pins disposed therein, wherein the frontend of the COB package slides into the metal cover to form the USB plug connector,
      a COB carrier having a top COB carrier and a bottom COB carrier to sandwich the metal cover having the end cap with the COB package deposited therein, wherein the top COB carrier further includes a slide button disposed on thereon,
   wherein the housing is configured to enclose, using the top cover and the bottom cover, sandwiching the frame having the core unit deposited therein by exposing the slide button through the top opening of the top cover, wherein the slide button, when being pushed sliding forward within the top opening of the top cover, causes the USB plug connector of the core unit to be deployed external to the housing through a front opening of the frame, and wherein the slide button, when being pushed sliding backward within the top opening of the top cover, causes the USB plug connector of the core unit to be retracted into the housing through the front opening of the frame.

18. The portable flash memory device of claim 17, wherein the top COB carrier further comprises a flexible section made of elastic material to form a top surface of the COB carrier having the slide button disposed thereon, wherein when the COB carrier slides into the housing, the flexible section pushes the slide button upwardly through the top opening of the top cover to allow the slide button to be pushed sliding back and forth.

19. The portable flash memory device of claim 18, wherein the top cover of the housing further comprises deploy lock grooves and a retract lock grooves disposed on an inner wall of the top cover, wherein the flexible section of the COB carrier comprises lock tabs, wherein when the USB plug connector is deployed by sliding the core unit forwardly, the lock tabs of the flexible section are engaged with the deploy lock grooves of the top cover to lock the core unit in a deployed position, and wherein when the USB plug connector is retracted by sliding the core unit backwardly, the lock tabs of the flexible section are engaged with the retract lock groove of the top cover to lock the core unit in a retracted position.

20. The portable flash memory device of claim 19, wherein the COB carrier further comprises slide rails disposed on a bottom surface of the bottom COB carrier, wherein the bottom cover of the housing further comprises slide tracks disposed on an inner wall of the bottom cover corresponding to the slide rails of the COB carrier to allow the COB carrier to slide within the housing in a smooth manner.

* * * * *